(12) United States Patent
Hanazono et al.

(10) Patent No.: US 6,906,821 B1
(45) Date of Patent: Jun. 14, 2005

(54) PRINTING CONTROL METHOD, PRINTING CONTROL APPARATUS FOR PRODUCING/TRANSMITTING PRINT COMMAND, COMPUTER PROGRAM OF PRINTING CONTROL, AND RECORDING MEDIUM FOR RECORDING COMPUTER PROGRAM

(75) Inventors: Haruki Hanazono, Nagano-ken (JP); Shoji Kojima, Washington, DC (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/546,189

(22) Filed: Apr. 10, 2000

(30) Foreign Application Priority Data

| Apr. 8, 1999 | (JP) | ............................................ 11-101773 |
| Apr. 8, 1999 | (JP) | ............................................ 11-101774 |
| Mar. 27, 2000 | (JP) | ....................................... 2000-086725 |

(51) Int. Cl.$^7$ ............................................ G06F 15/00
(52) U.S. Cl. ..................... 358/1.16; 358/1.15; 358/1.17; 358/1.14
(58) Field of Search ............................... 358/1.11, 1.16, 358/1.15, 434, 44, 1.17, 1.14; 382/239, 176

(56) References Cited

U.S. PATENT DOCUMENTS 4,710,886 A  12/1987  Heath

FOREIGN PATENT DOCUMENTS

| EP | 0 685 819 A2 | 12/1995 |
| JP | 07-106665 | 11/1995 |
| JP | 8-230249 A | 9/1996 |
| JP | 10-240463 A | 9/1998 |

*Primary Examiner*—Twyler Lamb
(74) *Attorney, Agent, or Firm*—Sughrue Mion, PLLC

(57) ABSTRACT

In a computer readable recording medium for recording thereon a program, the program causes a computer to execute: a process operation for storing a print command converted from print data into a memory; a process operation for reading the stored print command to transmit the read print command to a printing apparatus; and process operation executed by such that when a print command is read out, the storage area of the memory where the print command has been stored is rewritable. As a result, it is possible to provide a printing control technique capable of storing print commands into a small number of storage areas even when a total amount of these print commands is increased, and also capable of avoiding an interruption of printing operation.

28 Claims, 19 Drawing Sheets

PRINTING CONTROL METHOD, PRINTING CONTROL APPARATUS FOR PRODUCING/TRANSMITTING PRINT COMMAND, COMPUTER PROGRAM OF PRINTING CONTROL, AND RECORDING MEDIUM FOR RECORDING COMPUTER PROGRAM

BACKGROUND OF THE INVENTION

1. Field of the Invention

The present invention relates to a printing control method capable of saving an amount of use in a hard disk drive, a printing control apparatus for executing this printing control method, and a recording medium for recording a computer program to be used to execute the printing control method by a computer.

2. Description of Related Art

To perform a highspeed printing operation by a printing apparatus, such a printing control system has been proposed that both a process operation for converting image data to be printed (will be referred to as "print data" hereinafter) into a print command, and another process operation for transmitting this print command to the printing apparatus are executed in a parallel manner in separate processes.

In this sort of printing control system, the printing process operation is carried out as follows: First, upon receipt of a print request issued from an application program (AP), a print managing unit issues a print job. Next, a print processing unit receives this print job to produce print data to be printed out. Then, the print processing unit converts this produced print data into a print command having a specific format to a printing apparatus, and also stores this print command into a hard disk drive (HDD) as an intermediate file. The print command saved in the intermediate file is read out by a command transmitting unit, and then the read print command is stored into a SPOOL (Simultaneous Peripheral Operations OnLine) file by a spooler. Then, the print command is properly read out from the SPOOL file by a despooler, and thereafter, is transferred to the printing apparatus.

The above-described print processing operation by the print processing unit is separately carried out with respect to the command transmitting process operation by the command transmitting unit. However, since the processing speed of the command transmitting unit depends upon data transfer speed to the printing apparatus, generally speaking, this processing speed is slower than the processing speed of the print processing unit. To absorb a difference between both these processing speeds, while one print command is transmitted to the printing apparatus, subsequent print commands are stored as an intermediate file into the hard disk drive.

As explained above, in the case of such a printing control system that the print command is stored into the hard disk drive, however, all of the print commands related to one print job are saved until this print job is completed. As a result, the print commands will occupy large numbers of storage areas within the hard disk drive. As a result, when a storage capacity of a hard disk drive is small, there is a risk that these stored print commands may disturb operations of other application programs. Also, in such a printing case that a total amount of print commands to be stored is very large, for example, in the case that a large-sized area is printed out, if there is only small empty storage areas within a hard disk drive, then certain amounts of print commands cannot be stored into the small empty areas of this hard disk drive. Accordingly, there are possibilities that the printing operation is interrupted in a half way.

SUMMARY OF THE INVENTION

An object of the present invention is to provide a printing control technique capable of storing print commands into a small number of storage areas even when a total amount of these print commands is increased, and also capable of avoiding an interruption of printing operation.

To achieve the above-described object, a printing control method, according to an aspect of the present invention, is featured by causing a computer to execute; a process operation for storing a print command converted from print data into a memory; a process operation for reading the stored print command to transmit the read print command to a printing apparatus; and a process operation which makes, when a print command is read out, the storage area of the memory where the print command has been stored be rewritable.

BRIEF DESCRIPTION OF THE DRAWINGS

For a better understanding of the present invention, reference is made to a detailed description to be read in conjunction with the accompanying drawings, in which.

DETAILED DESCRIPTION OF THE PREFERRED EMBODIMENTS

Referring now to drawings, various embodiment modes of the present invention will be described in detail. It should be understood that the present invention is not limited to the below-mentioned embodiment modes.

Overall Arrangement of Printing System

Figure 1:
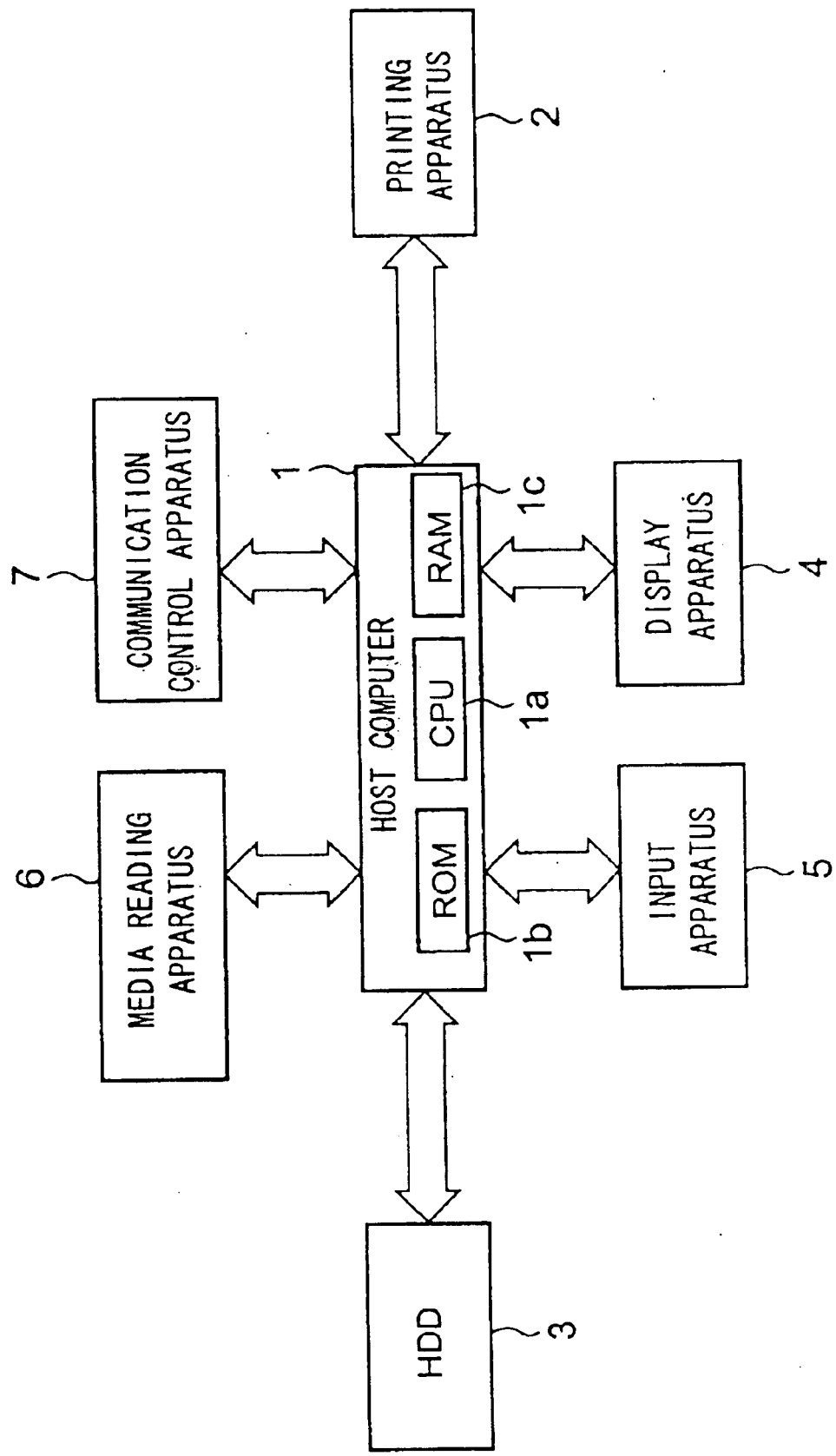
FIG. 1 is a schematic block diagram for representing an arrangement of a printing system to which the present invention is applied.

FIG. 1 schematically indicates an example of a printing system to which the present invention is applied. This printing system is arranged by connecting a host computer 1 via a cable to a printing apparatus 2. When the printing apparatus 2 receives both data to be printed and format information given to this print data from the host computer 1, this printing apparatus 2 executes a predetermined printing process so as to form an image on a print paper.

As the printing apparatus 2, if a printer may have the above-explained function, then any types of printers may be employed. For example, a serial printer, a page printer, and the like may be employed. Also, the inventive idea of the present invention may be applied to various sorts of printers. For instance, this inventive idea of the present invention may be applied to the following printers. First, there is a printer which prints out a text, an image, and the like formed on a computer. Second, there is a printer which prints out an image produced by using an image scanner. Third, there is a printer which prints out an image and the like produced by employing a digital still camera. Furthermore, various connecting modes between the printing apparatus 2 and the host computer 1 may be employed. For instance, a local connecting mode and a network connecting mode may be freely employed.

Under control of a system computer program, the host computer 1 executes programs, controls and monitors the executions of these programs. Concretely speaking, this host computer 1 is equipped with a CPU (Central Processing Unit) 1a, a ROM (Read-Only Memory) 1b, a RAM (Random Access Memory) 1c, and also as an auxiliary storage apparatus, either a built-in type hard disk unit (drive) or an externally-provided type hard disk unit HDD 3. The CPU 1a, the ROM 1b, and the RAM 1c are mounted on, for example, a system board. An application program (AP), and various sorts of programs are stored in this HDD 3. The application program is used to produce data to be printed out, and format information. As the programs, there is a print control program by which the host computer 1 may function as a printing control apparatus. The CPU 1a loads a program which is required to be executed from the HDD 3 to the RAM 1c, and then executes a process operation by using this program.

Furthermore, a display apparatus 4 having a monitor screen, an input apparatus 5, a media reading apparatus 6, and a communication control apparatus 7 are connected to this host computer 1. The input apparatus 5 is used to input various sorts of setting information. The communication control apparatus 7 functions as a connection interface between the host computer 1 and a local area network (LAN). Various sorts of images made by image data sent from the host computer 1 are displayed on the display apparatus 4. For instance, the display apparatus 4 displays thereon a dialog window for a print instruction in response to an instruction issued from the system program, the application program, the print control program, and so on. As the input apparatus 5, a keyboard and a pointing device such as a mouse are connected to the host computer 1. As the media reading apparatus 6, one sort, or more than two sorts of apparatuses are connected to the host computer 1, for instance, for reading data from a portable type recording medium such as a CD-ROM, a flexible disk (floppy disk), an opto-magnetic disk and a memory card and writing data into the recording medium when the medium is writable.

Normally, the print control program is developed by the manufacturer of the printing apparatus 2. Concretely speaking, the print control program is recorded in a computer readable format by this host computer 1 on a portable type recording medium, for example, a flexible (floppy) disk (FD) and a CD-ROM. Then, this program-recorded recording medium is put in a market. When the printing apparatus 2 is used, this print control program is read through the media reading apparatus 6 by the host computer 1, and thereafter, is installed in the HDD 3. Alternatively, the print control program may be installed by employing a print control program which is down-loaded via a network.

Various Printing Functions of First Printing Control Apparatus

Next, various printing functions of a printing apparatus will now be explained with reference to FIG. 2. These printing functions are realized by executing the print control program by the host computer 1.

Figure 2:
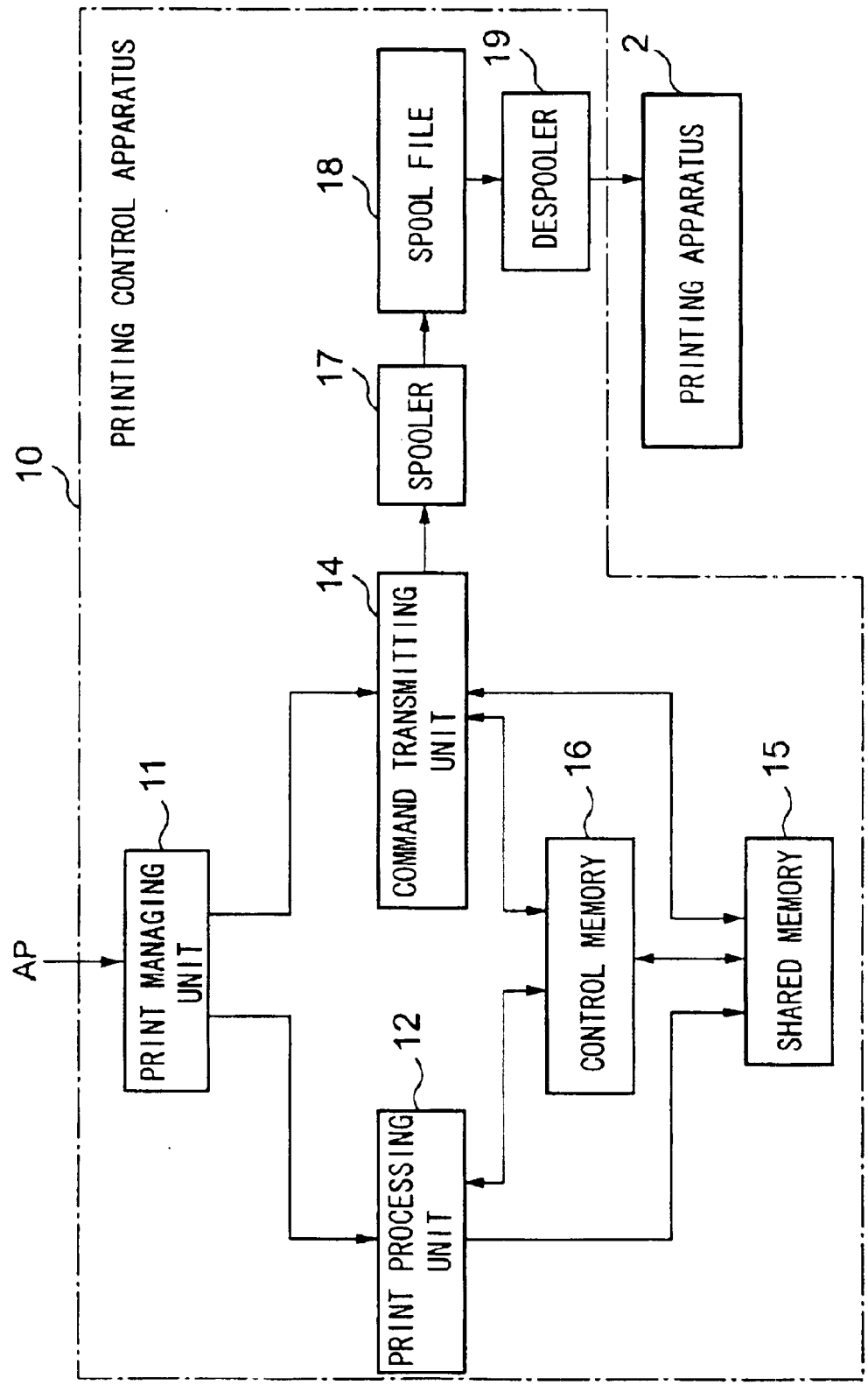
FIG. 2 is a schematic block diagram for showing an arrangement of a major unit of a printing control apparatus according to a first embodiment mode of the present invention.

FIG. 2 illustratively shows a structure of various functions realized by a printing control apparatus according to a first embodiment mode of the present invention. As shown in FIG. 2, the printing control apparatus, according to this first embodiment mode, is provided, as the functions thereof, with a print processing unit 12, a shared memory 15, a command transmitting unit 14, a spooler 17, a spooler file 18, a despooler 19, a print managing unit 11, and a control memory 16. The print processing unit 12 produces a print command. The shared memory 15 is such a memory for temporarily storing the produced print command. The command transmitting unit 14 reads a print command stored in the shared memory 15, and then transmits the read print command to the printing apparatus 2. The print managing unit 11 manages the operations of the print processing unit 12 and of the command transmitting unit 14. The control memory 16 stores therein data for use in managing both the print processing unit 12 and the command transmitting unit 14.

The print processing unit 12 functions as means capable of producing print data to be printed out, and also capable of converting this print data into a print command having a format specific to this printing apparatus 2. Also, the print processing apparatus functions as another process means for storing the converted print command into the shared memory 15. Furthermore, this print processing unit 12 also performs such a process operation that various sorts of information related to a print condition sent from the print managing unit 11 are set to the control memory 16. Alternatively, the setting of these various sorts of print condition information may be directly performed by the print managing unit 11. Further, as will be explained later, a memory managing unit may be provided, so that it sets these various sorts of print condition.

The command transmitting unit 14 executes such a process operation that a print command stored in the shared memory 15 is read out and the read print command is transmitted to the printing apparatus. Concretely speaking, the command transmitting unit 14 reads the print command from the shared memory 15 and then supplies the read print command to the spooler 17. Also, the command transmitting unit 14 executes such a releasing process operation that a storage area of the shared memory 15 into which the transmitted print command has been stored is set to be a rewritable area into which a new print command can be stored.

The spooler 17 transfers a print command transmitted from the command transmitting unit 14 to the spool file 18. The despooler 19 reads out print data which has been spool-processed into the spool file 18 at proper timing, and then transfers the read print data to the printing apparatus 2.

The process operation by the print processing unit 12 and the process operation by the command transmitting unit 14 are separately carried out under control of the CPU 1a. As a result, in appearance, the process operations of both the print processing unit 12 and the command transmitting unit 14 are executed in a parallel mode. When an acceptance of a print job is notified from the print managing unit 11 to the print processing unit 12, the printing operation is performed actually by the printing control apparatus 10.

In this first embodiment mode, both the shared memory 15 and the control memory 16 are provided in, for instance, the RAM 1c. Both the shared memory 15 and the control memory 16 are provided in such a manner that either of the shared memory 15 and the control memory 16 may be accessed by both the printing processing unit 12 and the command transmitting unit 14' The shared memory 15 temporarily stores therein a print command. In this first embodiment mode, the shared memory 15 is provided in correspondence with a print job. In other words, when a plurality of print jobs are present, shared memories are provided within the RAM 1c for the respective print jobs. On the other hand, the control memory 16 stores therein control data for use in controlling writing/reading operation of a print command. As previously explained, in such a case that a plurality of shared memories 15 are provided, plural sets of control data are stored in the control memory 16 in correspondence with these plural shared memories, respectively. These control data are distinguished with respect to each of print jobs.

In this case, when one data stored in the shared memory 15 is read out, the shared memory 15 is featured to be released so that other data may be stored into such a memory area in which the first-mentioned data has been stored. This feature of the shared memory is different from the intermediate file which holds all of the print commands are stored until the job is ended.

Figure 3:
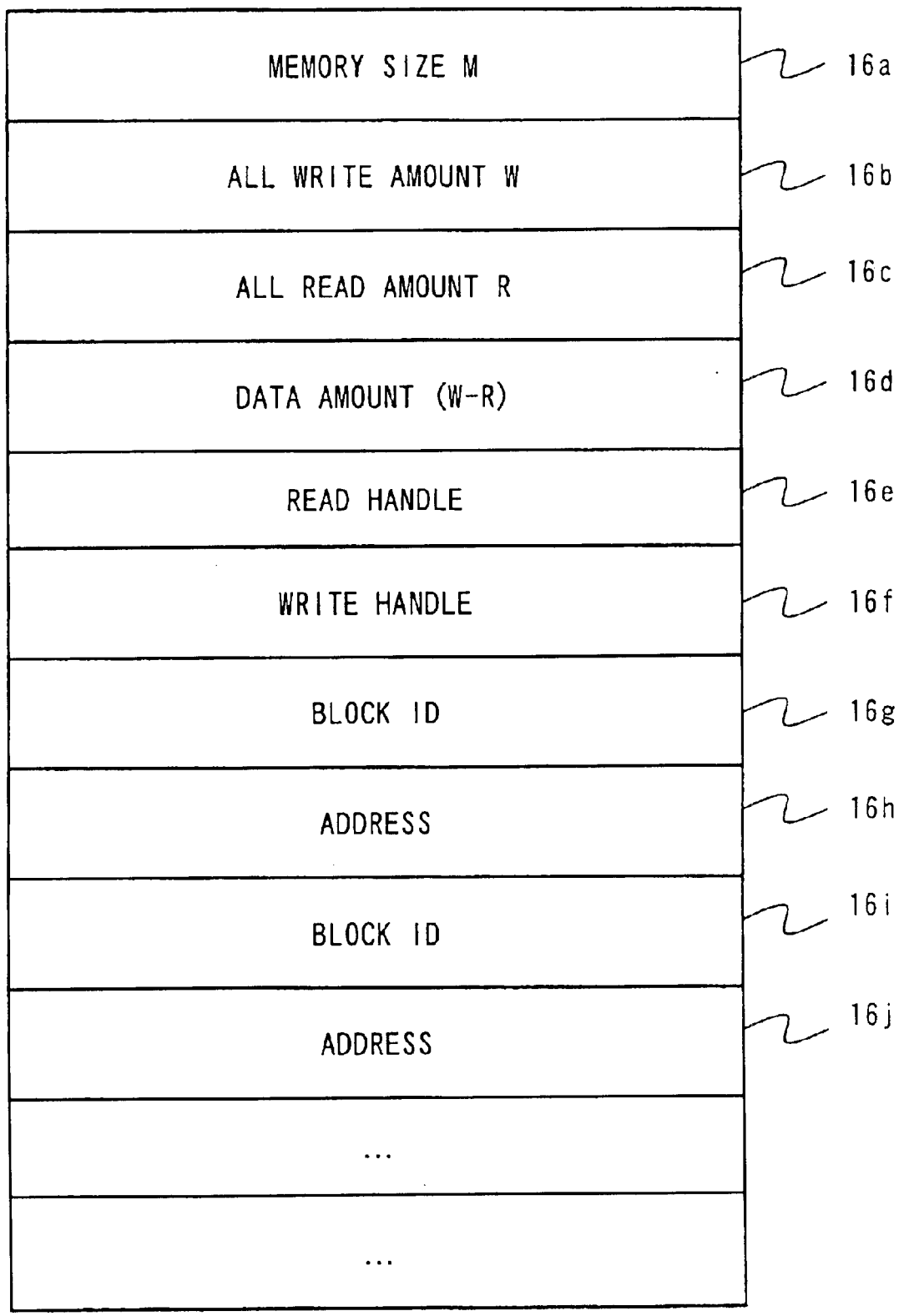
FIG. 3 is an explanatory diagram for explaining an example of control data stored in a control memory employed in the printing control apparatus of the first embodiment mode.

As indicated in FIG. 3, for example, the control memory 16 stores thereinto a shared memory size M 16a; an all write amount W 16b of the shared memory 15; an all read amount R 16c of the shared memory 15; a data amount (W−R) 16d saved in the shared memory 15; a read handle 16e indicative of data being accessed by the command transmitting unit 14; a write handle 16f representative of data being accessed by the print processing unit 12: a block ID 16g indicative of a block of a print command; an address 16h indicative of a position where this block is stored; another block ID 16i representative of a block of a print command; and further, an address 16j indicative of a position where this block is stored.

The memory size M 16a is written into the control memory 16 when the memory area of the shared memory 15 is set. It should also be noted that this memory size M 16a may be defined in a fixed manner and/or a dynamic manner. The all write amount W is equal to a value obtained by accumulatively summing write amounts after a print job is commenced and up to present time. The all read amount R is equal to a value obtained by accumulatively adding read amounts after a print job is commenced and up to present time. The data amount R corresponds to a difference between the all write amount W and the all read amount R, and indicates an amount of a print command being stored in the shared memory 15 at the present time. The read handle 16e is indicated by, for example, a block ID of a block being accessed by the command transmitting unit 14, or an address of this block. The write handle 16f is represented by, for instance, a block ID of a block being accessed by the print processing unit 12, or an address of this block. The block ID 16g and the block ID 16i represent blocks stored in the shared memory 15. A total number of the blocks is determined based upon both the storage capacity of the shared memory 15 and the dimensions of the blocks. In this first embodiment mode, it is so assumed that a plurality of blocks are stored. It should be understood that the shared memory 15 does not always own such a sufficiently large memory capacity by which all of the produced print commands can be stored thereinto under such a state that all of these print commands are present therein at the same time. As a result, after a print command of a certain block has been read out, this read block ID is invalidated, and then, a new block ID is rewritable into this storage area.

The print managing unit 11 secures the shared memory having a preset memory capacity, or a user-set memory capacity on the RAM 1c when, for example, the printing control apparatus 10 is turned ON, or is initiated by an application program. Upon receipt of a print, request sent from the application program, this print managing unit 11 issues a print job. The print managing unit 11 sends this print job to the print processing unit 12. At this time, as the above-explained various sorts of information related to the print condition, for example, the memory size M and the address 16h where the first block is stored, are transferred from this print managing unit 11 to the print processing unit 12.

Printing Process by Print Processing Unit in First Printing Control Apparatus

Figure 4:
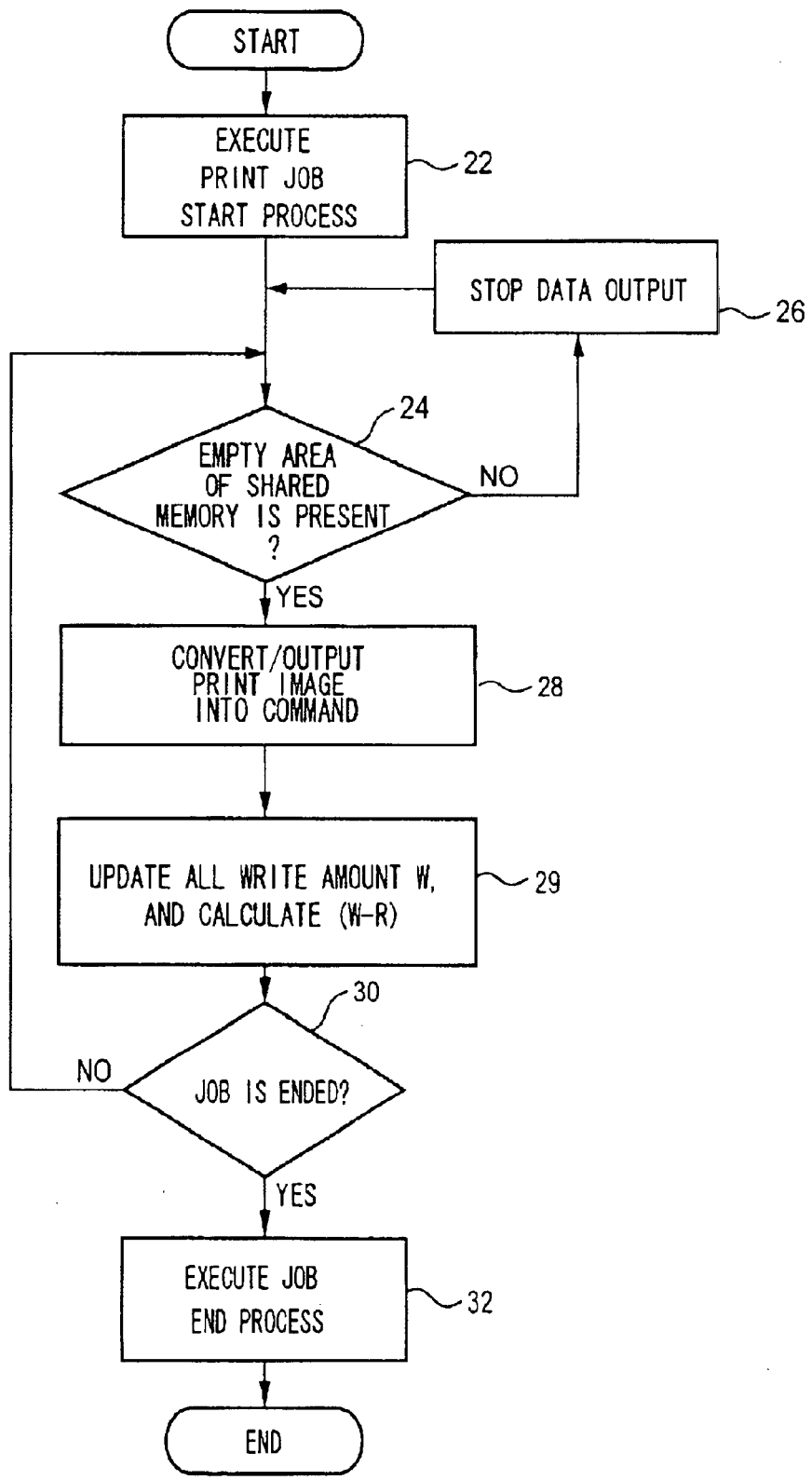
FIG. 4 is a flow chart for describing a process operation of a print processing unit employed in the printing control apparatus of the first embodiment mode.

Referring now to FIG. 4, a description will be made of a process operation of the print processing unit 12. The print processing unit 12 outputs print command data to the shared memory 15 in accordance with the following process sequence. When a print job is transferred from the print managing unit 11 to the print processing unit 12, this print processing unit 12 executes an initial setting process operation so as to commence the print job (step 22). In other words, both the memory size M and the first storage address, which are transferred from the print managing unit 11 in correspondence with the print job, are stored into the control memory 16, and also both the all write amount W and the all read amount R, which are saved in the control memory 16, are set to initial values thereof, for example, "0" by this print processing unit 12.

Next, the print processing unit 12 judges as to whether or not the shared memory 15 owns an empty memory area, referring to the memory size M of the shared memory and the data amount (W−R) of the shared memory 15 which are stored in the control memory 16 (step 24).

When there is no empty storage area in the shared memory 15, namely when M−(W−R)=0 (namely "NO" at step 24), the print processing unit 12 stops the data output operation to the shared memory 15 until the shared memory may have such an empty storage area (step 26). To the contrary, when the shared memory 15 owns the empty storage area, namely when M−(W−R)>0 (namely "YES" at step 24), this print processing unit 12 executes a conversion process from print data to a print command, and further, stores the converted print command into this empty storage area of the shared memory 15 (step 28). At the beginning, since W=R=0, it becomes M>0.

In this case, the storing is carried out for each of a preselected amount of these print commands. In this specification, it should be understood that this preselected amount of print commands will be referred to as a "block". When the print commands for one block are written into the shared memory 15, the print processing unit 12 stores both the block ID thereof and the storage address thereof into the control memory 16, as shown in FIG. 3. Then, the print processing unit 12 stores such a block ID indicative of the block which is presently being written into the write handle 16f.

Next, the print processing unit 12 adds an amount of written data to the all write amount W 16b indicative of the all data which have been written so as to calculate a new all write amount W. Then, the print processing unit 12 updates the all write amount 16b by this new all write amount W. At the same time, the print processing unit 12 calculates an all data amount (W−R) with reference to the all read amount R 16c stored in the control memory 16 in order to update the all data amount (W−R) 16d.

The process operations defined from the steps 24 to 29 are repeatedly carried out until an end of this print job is notified from the print managing unit 11 (namely "NO" at step 30). On the other hand, when the end of this print job is notified from the print managing unit 11 (namely. "YES" at step 30), the print processing unit 12 executes a process operation required to complete the print job with respect to the control memory 16 (step 32). Then, the print processing unit 12 accomplishes the data output operation of the print command to the shared memory 15. As this process operation to complete the print job, for instance, the write handle 16f is set to 0.

Command Processing Operation by Command Transmitting Unit in First Printing Control Apparatus Referring now to a flow chart of FIG. 5, a process sequence of the command transmitting unit 14 will be described.

Upon receipt of an instruction for sending a print command from the print managing unit 11, the command transmitting unit 14 starts to read the print command from the shared memory 15.

First, the command transmitting unit 14 judges as to whether or not a print command to be read is present in the shared memory 15 with reference to the data amount (W−R) 16d within this shared memory 15 in the control memory 16 (step 40). In the case that the print command to be read is present in the shared memory 15, that is, when W−R>0 ("YES" at step 40), the command transmitting unit 14 reads the print command from the shared memory 15 (step 42), and copies this read print command into a buffer (not shown) at a step 43. Thereafter, such a memory area where the copied print command has been stored in the shared memory 15 is brought into a rewritable condition (step 44). Subsequently, the command transmitting unit 14 sequentially transmits the print commands to the spooler 17 (step 46).

In this case, as the process operation defined at the step 44, for instance, the following process operation is carried out. That is to say, the command transmitting unit 14 invalidates a block ID as to the read block, and also rewrites the read handle into a block ID which should be subsequently read. Furthermore, the command transmitting unit 14 adds a data amount of the read block to the all read amount R, and calculates a data amount (W−R). Then, the command transmitting unit 14 stores the respective data amounts into the relevant storage areas 16c and 16d of the control memory 16 shown in FIG. 3, and updates these data amounts. As a result, rewritable areas may be newly secured in the shared memory 15.

The above-explained process operations defined from the steps 40 to 46 are repeatedly carried out until the print job is ended (step 48).

It should also be noted that both the above-explained process operation by the print processing unit 12 and the process operation by the command transmitting unit 14 are independently executed in a parallel manner. In this case, the process speed of the latter-mentioned process operation depends upon the data transfer speed to the printing apparatus. As a result, it is conceivable that the storage capacity of the shared memory 15 is set based upon the data transfer speed to the printing apparatus.

Concretely speaking, where the data transfer speed to the printing apparatus is high, since the data read speed from the shared memory 15 by the command transmitting unit 14 is similarly high and the storage capacity of the shared memory 15 may be increased. On the other hand, where the data transfer speed to the printing apparatus is low, the data read speed from the shared memory 15 by the command transmitting unit 14 is also low. In this case, the storage capacity of the shared memory 15 may be decreased and a RAM storage area to be used to execute the process other than the shared memory 15 may be increased. As a result, the overall efficiency of the printing system can be increased.

The data transfer speed to the printing apparatus may be predicted based upon a sort of a port. Concretely speaking, the data transfer speeds are increased in this order of a serial port, a parallel port, a USB port, and a 1394 port. As a consequence, the storage capacity of the shared memory 15 may be set in accordance with a user instruction, depending upon a sort of a used port. Also, the storage capacity of the shared memory 15 may be determined by automatically judging a used port.

As explained above, the data storage area in which the transmitted print command has been stored is released to allow new data to be rewritten in the shared memory 15. As a result of this, the printing operation can be carried out without storing the intermediate file comprised of a series of print commands into the hard disk drive. Therefore, the highspeed data access operation can be realized. Also, the used storage amount of the hard disk drive can be reduced. More specifically, assuming now that 6 colors are used per 1 pixel, 2 bit/dot×6=12 bits are required in order to represent one pixel, and further assuming that both resolution in a longitudinal direction of an A4-sized paper (namely 8×11 inches) and resolution in a transverse direction thereof are selected to be 720 dpi, respectively, a hard disk storage area of 2×6×8 11×720×720=547 megabits (68 Mbytes) per one sheet of A4-sized paper is required. A memory area having a small storage capacity is secured as a shared memory space and a hard disk storage area of (68 Mbytes)×(total sheet number of A4-sized paper) can be reduced.

In accordance with the printing system of this first embodiment mode, the print command is stored into the shared memory whose access time is generally short, while such a print command is not stored into the hard disk drive whose access time is generally long. As a result, since a total number of accessing operations to the hard disk drive is reduced, the printing speed can be increased.

Arrangement of Second Printing Control Apparatus

Referring now to drawings, a printing control apparatus according to a second embodiment mode of the present invention will be described. This second embodiment mode may be realized by employing a similar hardware resource to that of the above-explained first embodiment mode.

This second embodiment mode may be realized in such a manner that the host computer 1 reads a printing control program. As indicated in FIG. 2, a printing control apparatus, according to this second embodiment mode, is equipped with a print managing unit 11 for issuing a print job upon receipt of a print request sent from an application program (AP); a print processing unit 12 for performing such a process operation that print data to be printed out is produced and also this produced print data is converted into a print command having a specific format to a printing apparatus; a shared memory 15 formed within a RAM 1c for temporarily storing thereinto the print command, and a command transmitting unit 14 for executing such a process operation that the print command stored in the shared memory 15 is read and this read print command is transmitted to the printing apparatus. This printing control apparatus is further arranged by a control memory 16 for controlling read/write operations of the print command in the shared memory 15; a spooler 17 for transferring a print command transmitted from the command transmitting unit 14 to a spool file 18; and a despooler 19 for reading the print data spool-processed into the spool file 18 at proper timing and for transferring the read print data to the printing apparatus. As previously explained, a major functional arrangement of this second embodiment mode is similar to that shown in FIG. 2. As a consequence, different points will be explained in this second embodiment mode.

Figure 6:
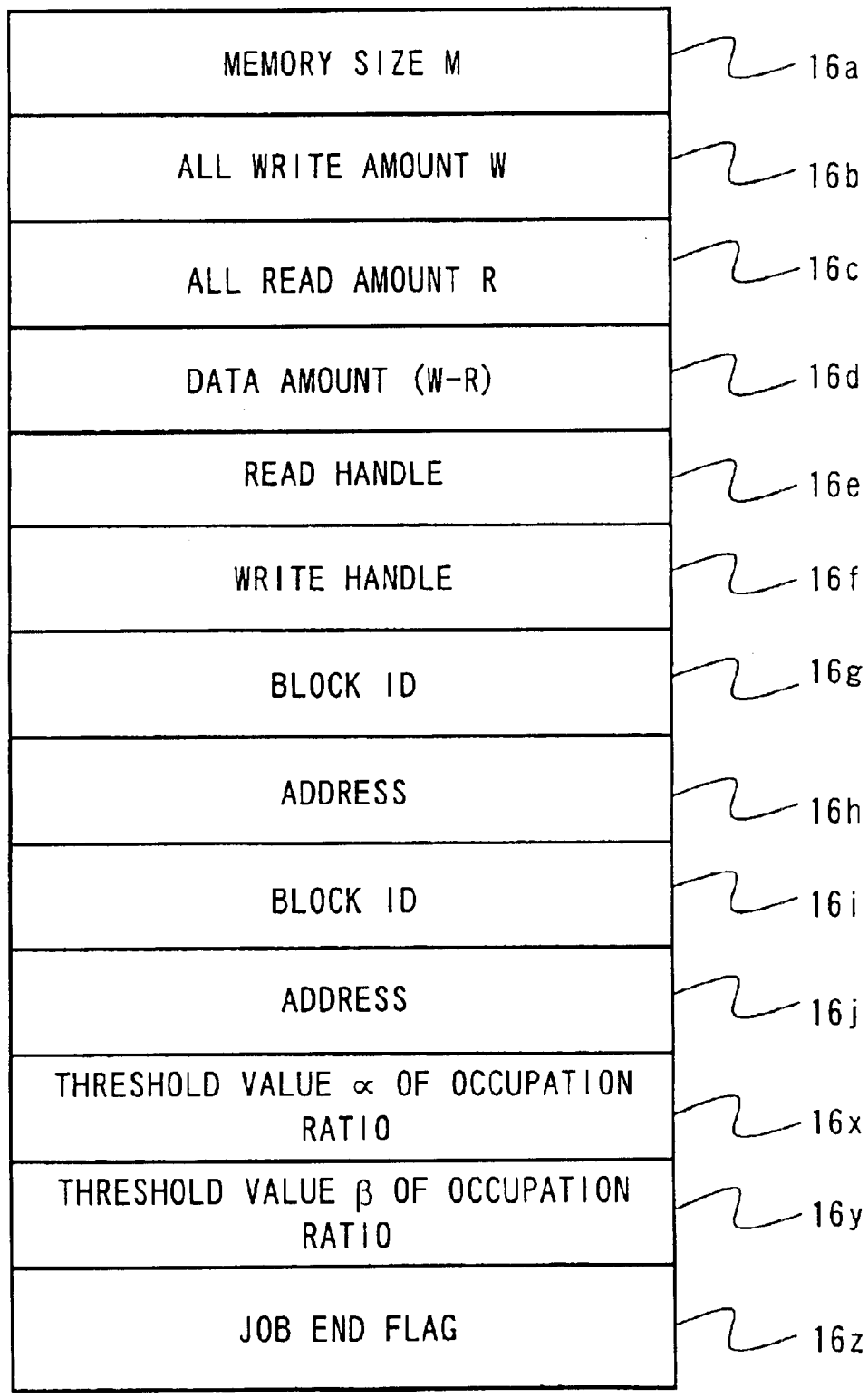
FIG. 6 is an explanatory diagram for explaining an example of control data stored in a control memory employed in a printing control apparatus of a second embodiment mode.

As indicated in FIG. 6, the control memory 16 stores thereinto a shared memory size M 16a; an all write amount W 16b of the shared memory 15; an all read amount R 16c of the shared memory 15; a data amount (W−R) 16d saved in the shared memory 15; a read handle 16e indicative of data being accessed by the command transmitting unit 14; a write handle 16f representative of data being accessed by the print processing unit 12; a block ID 16g indicative of a block of a print command; an address 16h indicative of a position where this block is stored; another block ID 16i representative of a block of a print command; an address 16j indicative of a position where this block is stored; a threshold value α16x of an occupation ratio; another threshold value β16y thereof; and a job end command flag 16z. The threshold values α16x and β16y correspond to threshold values for ratios of data amounts written in the shared memory 15 to the memory capacity M. In this second embodiment mode, a ratio of a data amount stored in the shared memory 15 to a size of the shared memory 15 is controlled within a predetermined range.

It should be understood that in the above-explained arrangement, the print processing unit 12 may function as a first stopping means for stopping a write operation of a print command in addition to the previously-described functions realized in the first embodiment mode. Also, the command transmitting unit 14 may function as a second stopping means for stopping a read operation of a print command in addition to the previously-explained functions realized in the first embodiment mode.

Also, in the above-explained arrangement, the ratio of the data amount written into the shared memory 15 to the memory capacity M is employed as an index used to grasp a storage condition of data in the shared memory 15. However, the present invention is not limited to this. For instance, a data amount may be indicated by an absolute amount.

Printing Process by Print Processing Unit in Second Printing Control Apparatus

Upon receipt of such an instruction from the print managing unit 11 that a print command be produced, the print processing unit 12 is operated as follows.

Figure 7:
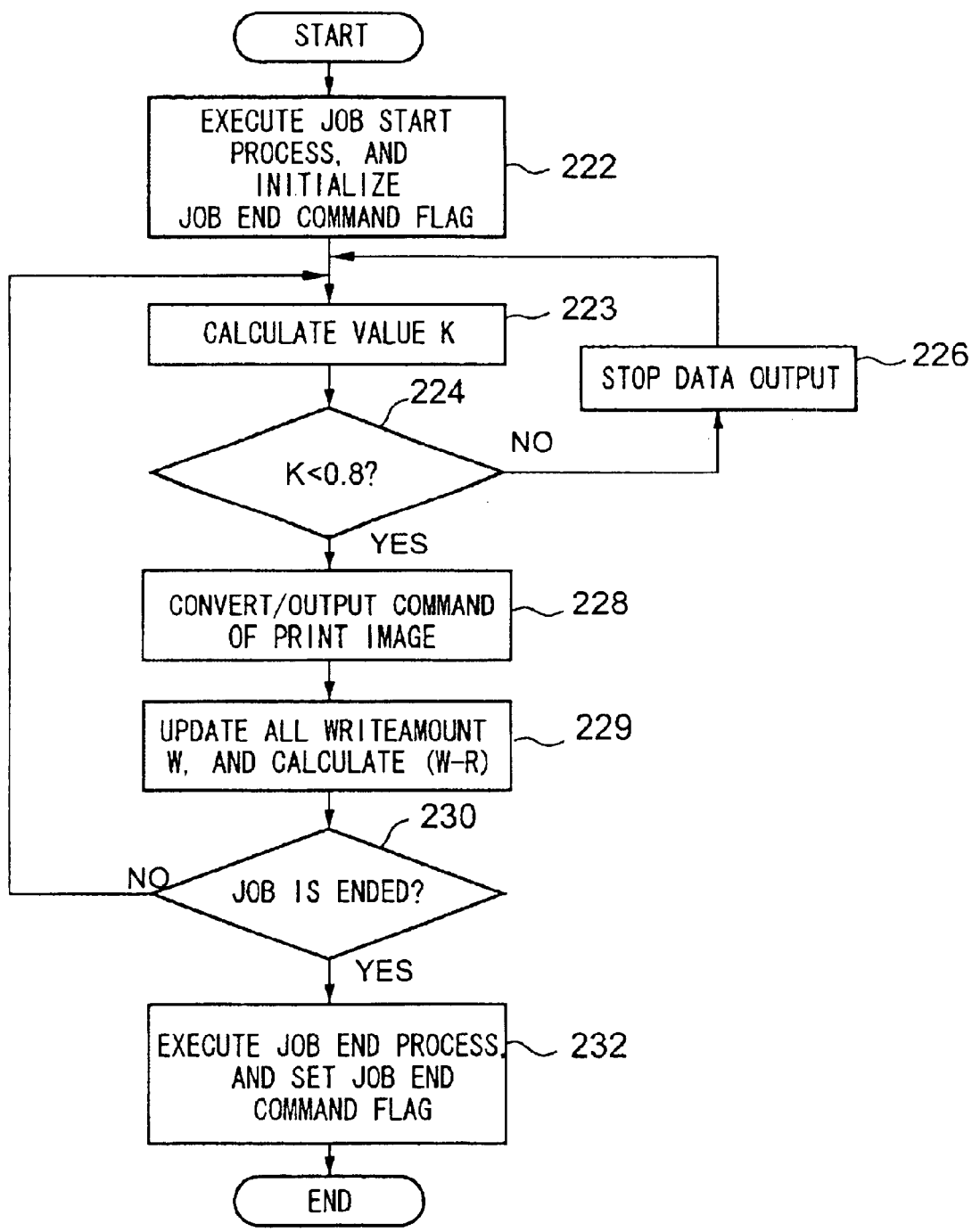
FIG. 7 is a flow chart for describing a process operation of a print processing unit employed in the printing control apparatus of the second embodiment mode.

Referring now to FIG. 7, a description will be made of a process operation of the print processing unit 12. The print processing unit 12 outputs print command data to the shared memory 15 in accordance with the following process sequence. When a print job is transferred from the print managing unit 11 to the print processing unit 12, this print processing unit 12 executes an initial setting process operation so as to commence the print job in a similar manner to the first embodiment mode. Also, this print processing unit 12 initializes the job end command flag 16z of the control memory 16 (step 222).

Next, the print processing unit 12 calculates K=(W−R)/M with reference to the shared memory size M 16a in the control memory 16, and the data amount (W−R) 16d within the shared memory 15 (step 223). Then, the print processing unit 12 compares the resultant "K" with the threshold value "α" of the occupation ratio within the control memory 16 shown in FIG. 6. In this second embodiment mode, this threshold value "α" is set to α=0.8. As a result, the print processing unit 12 judges as to whether or not K>0.8. In other words, the print processing unit 12 judges as to whether or not the data amount within the shared memory 15 exceeds 80 percents of the shared memory size (step 224). In this second embodiment mode, the threshold value "α" of the K value in the print processing unit 12 is set to 0.8. However, this set threshold value is one of the typical threshold values. The threshold value may be set to any arbitrary positive value smaller than 1.

When the value of K is larger than, or equal to 0.8, namely when the data amount within the shared memory 15 is larger than, or equal to 80 percents of the memory size M of the shared memory 15 ("NO" at step 224), the print processing unit 12 stops the data output operation to the shared memory 15 until the data amount within the shared memory 15 becomes smaller than 80 percents of the memory size M of this shared memory 15 (step 226). On the other hand, when the value of K is smaller than 0.8, namely when the data amount within the shared memory 15 is smaller than 80 percents of the memory size M of the shared memory 15 (YES at step 224), this print processing unit 12 executes a process operation for converting print data into a print command, and also stores the converted print command into an empty area of the shared memory 15 (step 228). Similar to the first embodiment mode, the print processing unit 12 executes an update process operation of the all write amount W, and also calculates a data amount (W−R) so as to update the relevant data of the control memory 16 (step 229).

The process operations defined from the steps 223 to 229 are repeatedly carried out until an end of this print job is notified from the print managing unit 11 (namely "NO" at step 230). On the other hand, when the end of this print job is notified from the print managing unit 11 (namely "YES" at step 230), the print processing unit 12 executes a process operation required to complete the print job and sets the job end command flag 16z with respect to the control memory 16 (step 232). Then, the print processing unit 12 accomplishes the data output operation of the print command to the shared memory 15. As this process operation to complete the print job, for instance, the read handle 16e is set to 0.

Figure 8:
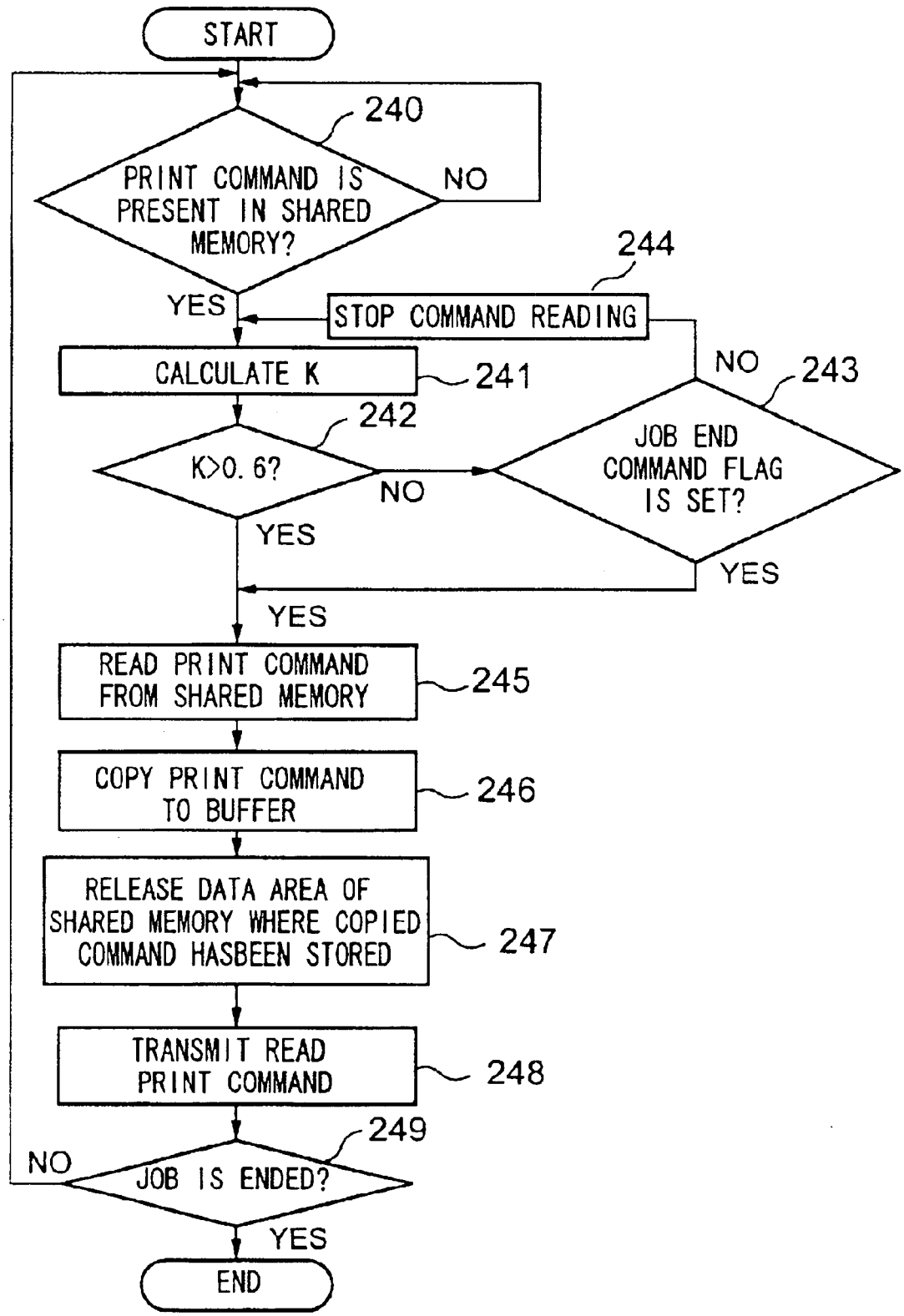
FIG. 8 is a flow chart for describing a process operation of a command transmitting unit employed in the printing control apparatus of the second embodiment mode.

Command Processing Operation by Command Transmitting Unit in Second Printing Control Apparatus Referring now to a flow chart shown in FIG. 8, a process sequence of the command transmitting unit 14 will be explained.

First, the command transmitting unit 14 judges as to whether or not a print command to be read is present in the shared memory 15, referring to the data amount (W−R) 16d within this shared memory 15 in the control memory 16 (step 240). In the case that the print command to be read is present in the shared memory 15, that is, when W−R>0 ("YES" at step 240), the command transmitting unit 14 calculates K=(W−R)/M with reference to both the shared memory size M 16a within the control memory 16 and also the data amount (W−R) 16d within the shared memory 15 (step 241). Then, the command transmitting unit 14 compares the resultant K value with the threshold value β. In this second embodiment mode, the command transmitting unit 14 judges as to whether or not K>0.6. In other words, the command transmitting unit 14 judges as to whether or not the data amount within the shared memory 15 exceeds 60 percents of the shared memory size (step 242). In this second embodiment mode, the threshold value "β" of the K value in the command transmitting unit 14 is set to 0.6. However, this set threshold value is one of the typical threshold values. The threshold value β may be set to any arbitrary positive value smaller than the threshold value a of K (0.8 in second embodiment mode) used in the print processing unit 12.

When the value of K is smaller than, or equal to 0.6, namely when the data amount within the shared memory 15 is smaller than, or equal to 60 percents of the shared memory size M ("NO" at step 242), the command transmitting unit 14 judges as to whether or not the job end command flag 16z is set with reference to the control memory 16 (step 243). In such a case that the job end command flag 16z is not set ("NO" at step 243), the command transmitting unit 14 stops reading of the print command from the shared memory 15 until the data amount within the shared memory 15 becomes larger than 60 percents of the shared memory size M (step 244)

As previously described, since the process operations defined at the step 224 (NO), the step 226, the step 242 (NO), and the step 244 are carried out, the command transmitting unit 14 executes the control operation in order that the value of K becomes larger than 0.6 and becomes smaller than 0.8, namely the data amount within the shared memory 15 becomes larger than 60 percents of the shared memory size and also becomes smaller than 80 percents thereof. As a result, it can be avoided such a fact that the occupation ratio of the CPU 1a is concentrated to the process operation with respect to the shared memory 15, and the CPU resource can be allocated to the respective modules of the printer driver, and the application programs and OS (operating system) other than this printer driver. As a result, the loads can be properly distributed.

On the other hand, when the value of K is larger than 0.6, namely when the data amount within the shared memory 15 is larger than 60 percents of the shared memory size M ("YES" at step 242), or in the case that the job end command flag 16z is set ("YES" at step 243), namely in such a case that even if the data amount within the shared memory 15 is smaller than, or equal to 60% of the shared memory size, then the print job is ended, the command transmitting unit 14 reads out the print command from the shared memory 15 (step 245), and copies this read print command into a buffer (not shown) at a step 246. Thereafter, such a memory area where the copied print command has been stored in the shared memory 15 is brought into a rewritable condition (step 247). Subsequently, the command transmitting unit 14 sequentially transmits the print commands to the spooler 17 (step 248). The process operations defined from the step 240 to the step 248 are repeatedly carried out until the print job is ended (step 249).

Arrangement/Operation of Third Printing Control Apparatus

Figure 9:
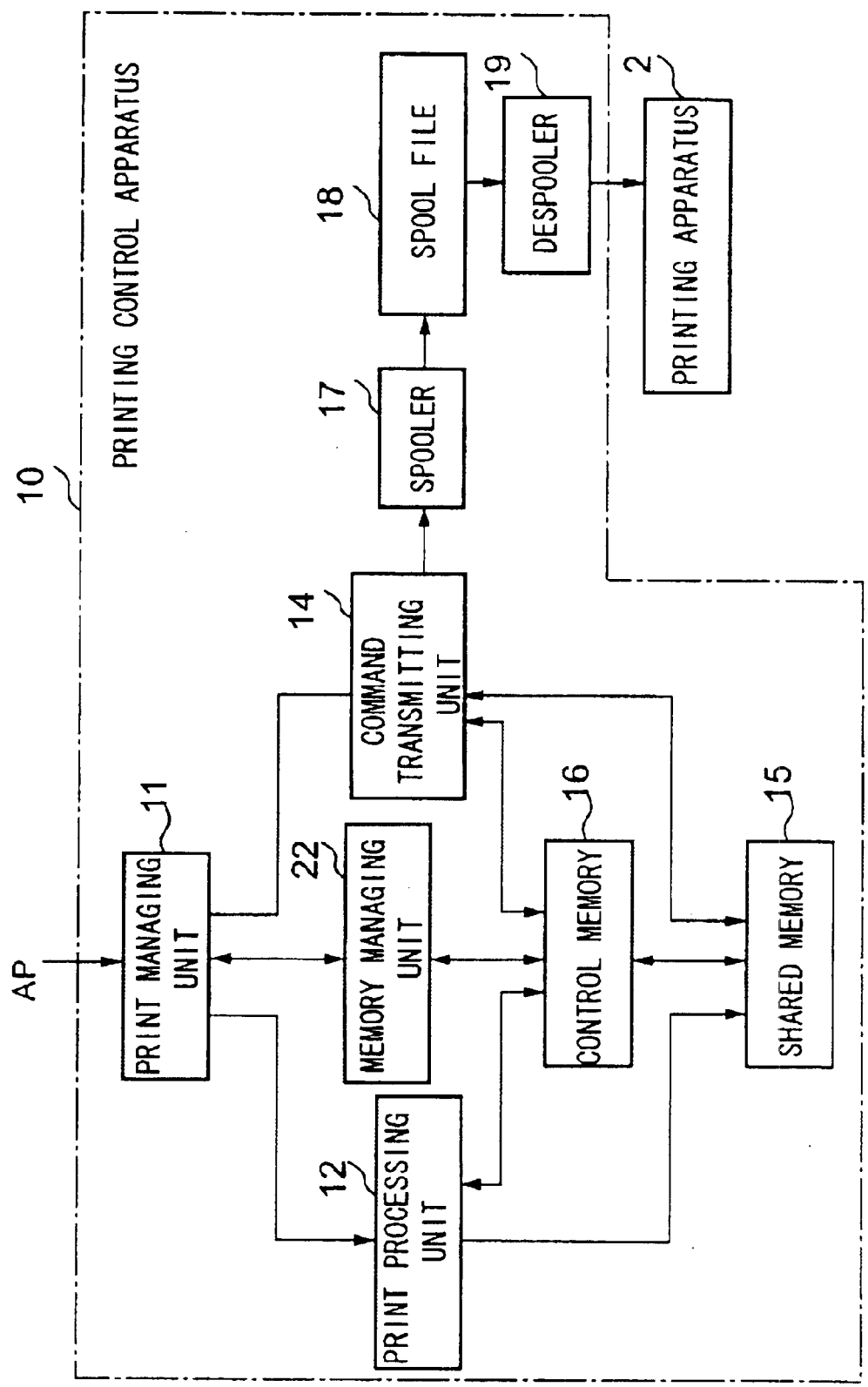
FIG. 9 is a schematic block diagram for indicating an arrangement of a major unit of a printing control apparatus according to a third embodiment mode of the present invention.

FIG. 9 is a structural diagram for showing a major unit of a printing control apparatus according to a third embodiment mode of the present invention. In the printing control apparatus of this third embodiment mode, the write/read control operations into/from the shared memory 15, which have been processed by the print processing unit 12 and the command transmitting unit 14 in the first and second embodiment modes, are carried out by another memory managing unit 22.

That is, in this third embodiment mode, the print processing unit 12 mainly performs a converting operation from a print image to a print command, and also a writing operation of a print command into the shared memory 15. The command transmitting unit 14 mainly reads a print command from the shared memory 15, copies a print command to a buffer, and transmits a read print command.

Arrangement of Fourth Printing Control Apparatus

Referring now to drawings, a printing control apparatus according to a fourth embodiment mode of the present invention will be described. This fourth embodiment mode may be realized by employing a similar hardware resource to that of the above-explained first embodiment mode.

Figure 10:
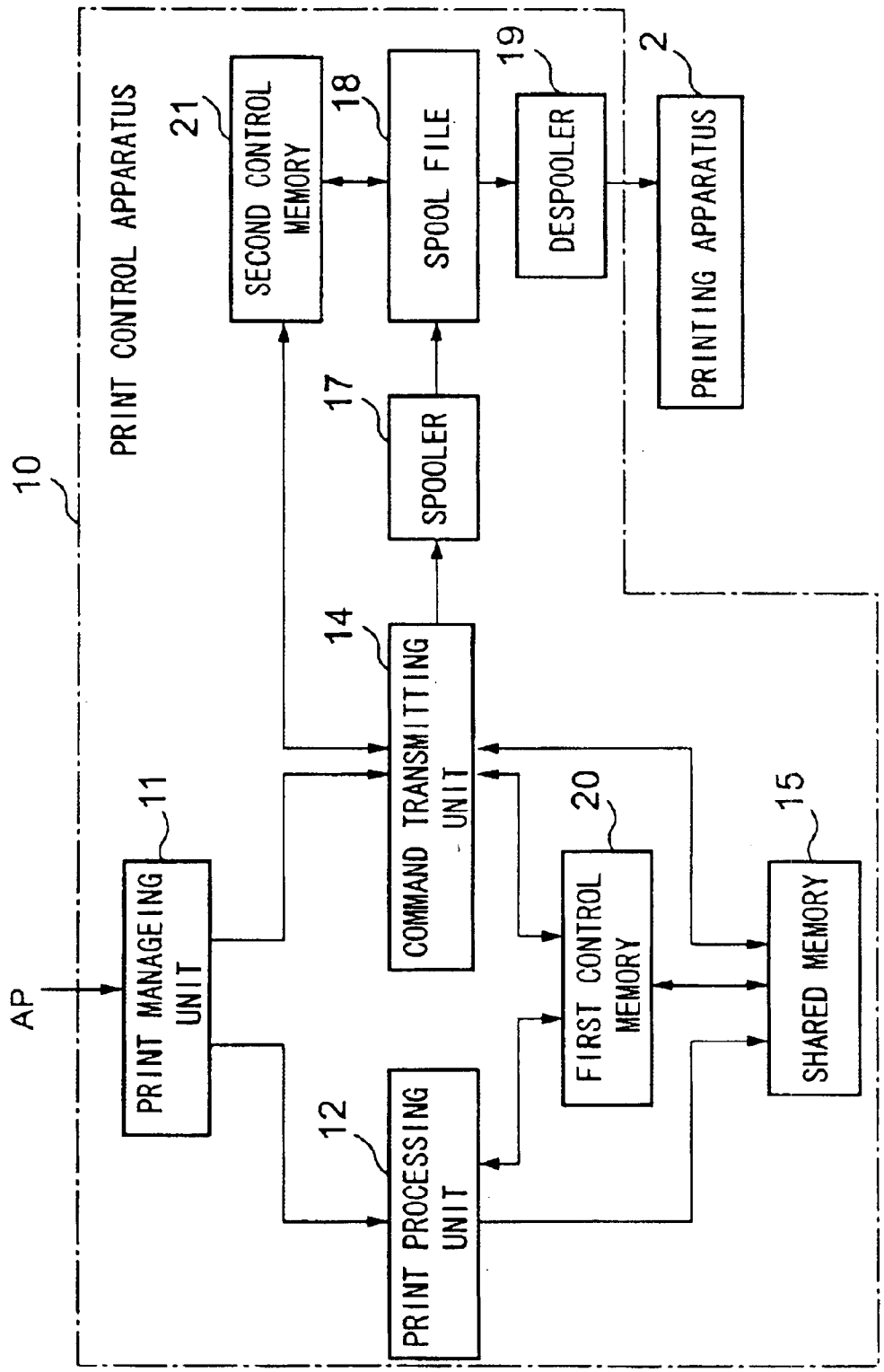
FIG. 10 is a schematic block diagram for indicating an arrangement of a major unit of a printing control apparatus according to a fourth embodiment mode of the present invention.

This fourth embodiment mode may be realized in such a manner that the host computer 1 reads a printing control program. As indicated in FIG. 10, a basic arrangement of a printing control apparatus, according to this fourth embodiment mode, is similar to that of the printing control apparatus shown in FIG. 2. That is to say, this fourth printing control apparatus contains a print managing unit 11, a print processing unit 12, a shared memory 15, a command transmitting unit 14, a spooler 17, a spooler file 18, and a despooler 19. The arrangements of these units are similar to those of FIG. 2. On the other hand, this fourth printing control apparatus owns such a different structure from those of the first and second embodiment modes, in that it comprises a first control memory 20 and a second control memory 21. The first control memory 20 controls read/write operations of a print command from/into the shared memory 15. The second control memory 21 controls read/write operations of a print command from/into the spool file 18. In the following, this structural difference will mainly be explained.

Figure 11:
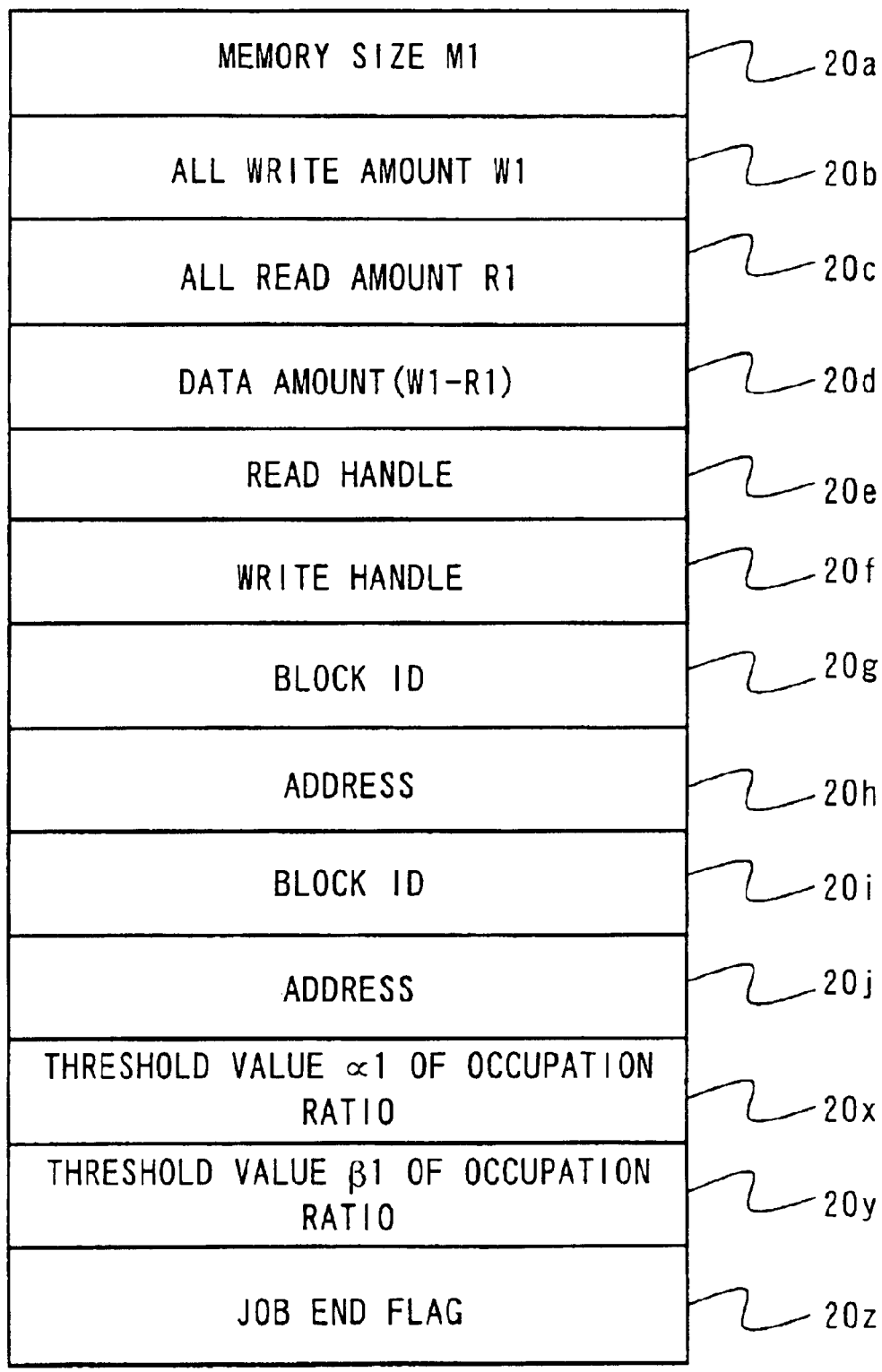
FIG. 11 is an explanatory diagram for explaining an example of control data stored in a control memory employed in the printing control apparatus of the fourth embodiment mode.

As indicated in FIG. 11, the first control memory 20 stores thereinto data at storage areas 20a to 20z. These stored data are identical to those shown in FIG. 6. It should be understood that suffixes are attached to these data in order to be discriminated from those of the second control memory 21, for example, a shared memory size M1.

Figure 12:
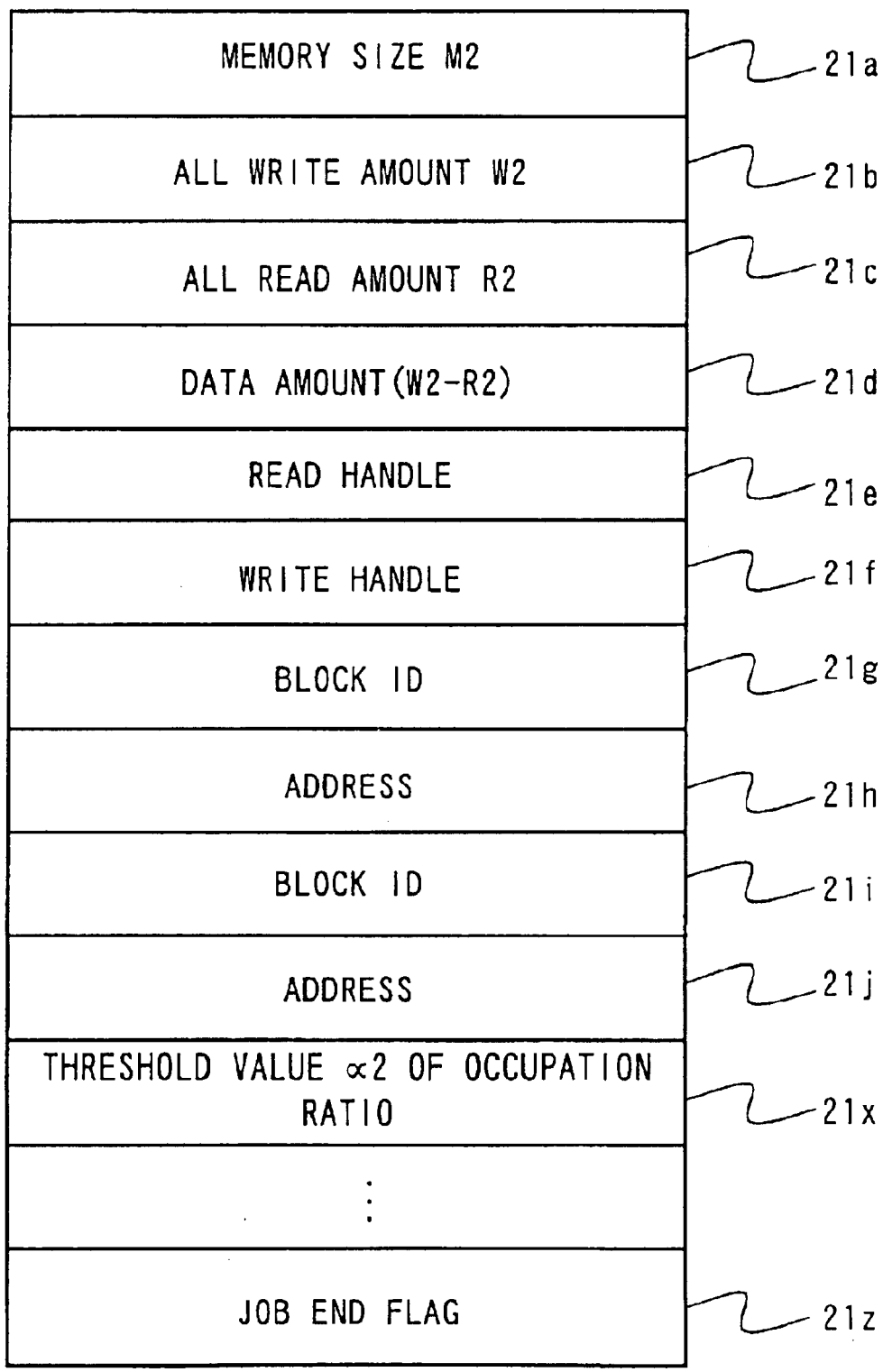
FIG. 12 is an explanatory diagram for explaining an example of control data stored in a control memory employed in the printing control apparatus of the fourth embodiment mode.

Similarly, as indicated in FIG. 12, in the second control memory 21, the following data are stored in storage areas 21a to 21z: i.e., an allowed capacity M2 (for example, same memory size as shared memory 15) which is set when a printing operation is commenced; an all write amount W2 of the spool file 18 (present spool file size); an all read amount R2 of the spool file 18 (amount of transmitted data); an amount of not-yet transmitted data (W2−R2) within the spool file 18; a read handle indicative of data to which the spooler 17 accesses; a write handle indicative of data to which the despooler 19 accesses; a block ID indicative of a block of a print command and an address of this block; a threshold value "α2" of an occupation ratio; and a job end command flag. This threshold value α2 corresponds to a threshold value of a ratio of a data amount written in the spool file 18 to the file capacity M2. Similarly, suffixes 2 are attached to these data, as shown in FIG. 12.

In this fourth embodiment mode, the printing process unit 12 corresponds to both a means for converting a print image into a print command and for storing the converted print command into the shared memory, and a first stopping means (which will be discussed later). Also, the command transmitting unit 14 corresponds to a means for reading a print command, a means for storing the print command, a first stopping means, and a second stopping means.

Printing Process by Print Processing Unit in Fourth Printing Control Apparatus

Figure 13:
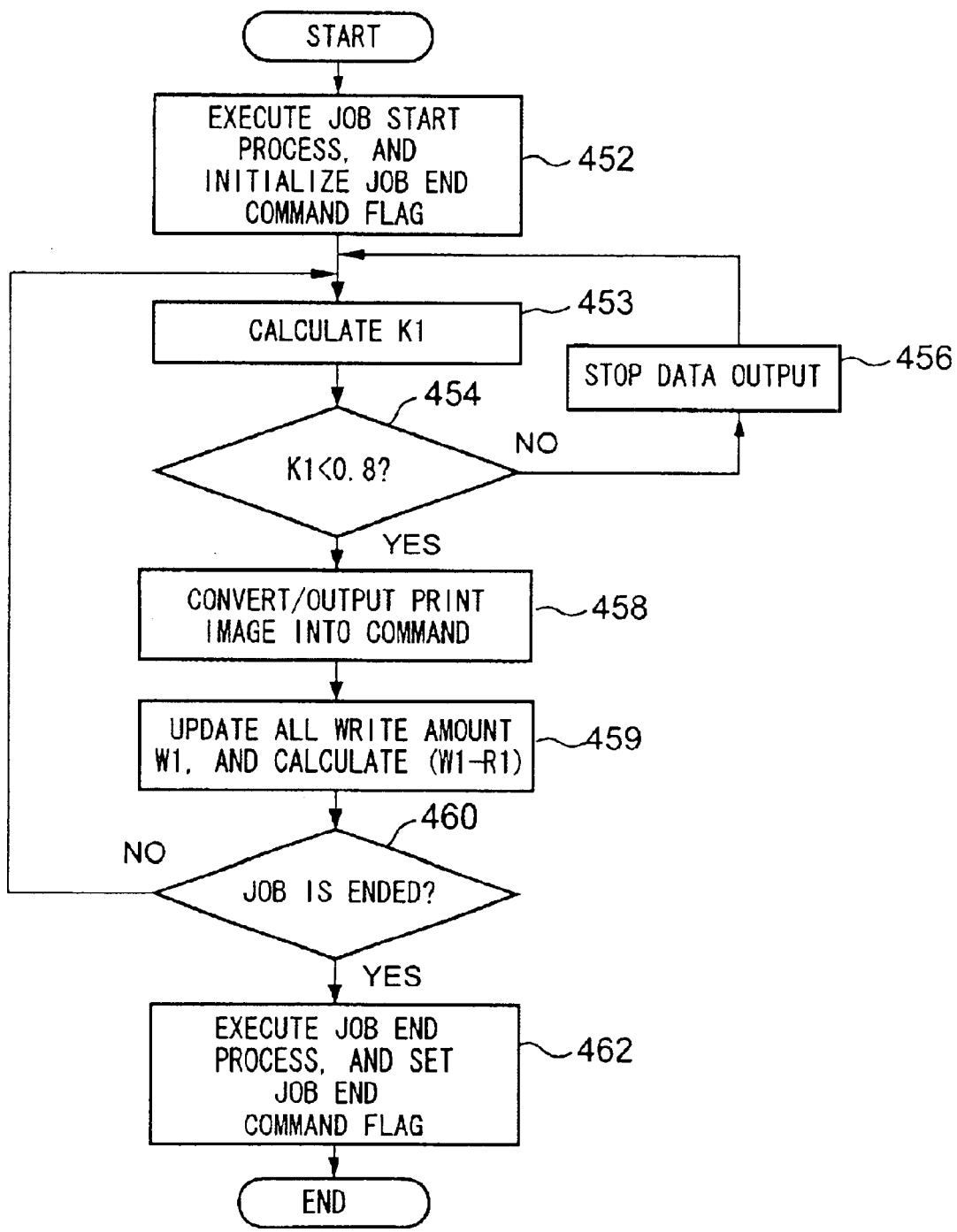
FIG. 13 is a flow chart for describing a process operation of a print processing unit employed in the printing control-apparatus of the fourth embodiment mode.

Referring now to FIG. 13, a description will be made of a process operation of the print processing unit 12. The print processing unit 12 outputs print command data to the shared memory 15 in accordance with the following process sequence. When a print job is entered from the print managing unit 11 to the print processing unit 12, this print processing unit 12 first executes an initial setting process operation so as to commence the print job as in the first embodiment mode. Also, this print processing unit 12 initializes the job end command flag of the first control memory 20 (step 452).

Next, the print processing unit 12 calculates K1=(W1−R1)/M1, referring to the shared memory size M1 in the first control memory 20, and the data amount (W1−R1) within the shared memory 15 (step 453). Then, the print processing unit 12 judges as to whether or not K1>0.8. In other words, the print processing unit 12 judges as to whether or not the data amount within the shared memory 15 exceeds 80 percents of the shared memory size (step 454). In this fourth embodiment mode, the threshold value "α1" of the K1 value in the print processing unit 12 is set to 0.8. However, this set threshold value α1 is one of the typical threshold values. The threshold value α1 may be set to any arbitrary positive value smaller than 1.

When the value of K is larger than, or equal to 0.8, namely when the data amount within the shared memory 15 is larger than, or equal to 80 percents of the memory size of the shared memory 15 ("NO" at step 454), the print processing unit 12 stops the data output operation to the shared memory 15 until the data amount within the shared memory 15 becomes smaller than 80 percents of the memory size of this shared memory 15 (step 456). On the other hand, when the value of K1 is smaller than 0.8, namely when the data amount within the shared memory 15 is smaller than 80 percents of the memory size of the shared memory 15 (YES at step 454), this print processing unit 12 executes a process operation for converting print data into a print command, and also stores the converted print command into an empty area of the shared memory 15 (step 458).

Similar to other embodiment modes, the print processing unit 12 executes an update process operation of the all write amount W1, and also calculates a data amount (W1−R1). Then the print processing unit 12 stores the calculation result into the relevant storage area of the first control memory 20 so as to update the stored data (step 459).

The process operations defined from the step 454 to the step 459 are repeatedly carried out until an end of this print job is notified from the print managing unit 11 (namely "NO" at step 460). On the other hand, when the end of this print job is notified from the print managing unit 11 (namely "YES" at step 460), the print processing unit 12 executes a process operation required to complete the print job, and sets the job end command flag of the first control memory 20 (step 462). Then, the print processing unit 12 accomplishes the data output operation of the print command to the shared memory 15.

Command Processing Operation by Command Transmitting Unit in Fourth Printing Control Apparatus Referring now to a flow chart shown in FIG. 14, a process sequence of the command transmitting unit 14 will be explained.

First, the command transmitting unit 14 judges as to whether or not a print command to be read is present in the shared memory 15, referring to the data amount (W1−R1) 20d within this shared memory 15 in the first control memory 20 shown in FIG. 11 (step 470).

In the case where the print command to be read is present in the shared memory 15, that is, when W1−R1>0 ("YES" at step 470), the command transmitting unit 14 calculates K2=(W2−R2)/M2, referring to both the allowed capacity M2 within the second control memory 21 and also the data amount of the not-yet-transmitted data (W2−R2) within the spool file 18 (step 471). Then, the command transmitting unit 14 judges as to whether or not K2<0.8. In other words, the command transmitting unit 14 judges as to whether or not the data amount of the not-yet-transmitted data in the spool file 18 exceeds 80 percents of the allowed capacity M2 (step 472). In this fourth embodiment mode, the threshold value "α2" of the K2 value in the command transmitting unit 14 is set to 0.8. However, this set threshold value "α2" is one of the typical threshold values. The threshold value "α2" may be set to any arbitrary positive value smaller than 1.

When the value of K2 is larger than, or equal to 0.8, namely when the data amount of the not-yet-transmitted data within the spool file 18 is larger than, or equal to 80 percents of the allowed capacity M2 ("NO" at step 472), the command transmitting unit 14 stops transmitting of the print command to the spooler 17 until the data amount of the not-yet-transmitted data within the spool file 18 becomes smaller than 80 percents of the allowed capacity M2 (step 472a). As previously described, the command transmitting unit 14 executes the command transmission control operation to the spooler 17 so that the value of K2 becomes smaller than 0.8, or the not-yet-transmitted data in the spool file 18 becomes smaller than 80 percents thereof. As a result, it can be avoided that the occupation ratio of the CPU 1a is concentrated to the process operation with respect to the command transmission to the spooler 17, and the CPU resource can be allocated to the respective modules of the printer driver, and the application programs and OS (operating system) other than this printer driver. As a result, the loads can be properly distributed.

On the other hand, when the value of K2 is smaller than 0.8, namely the data amount of the not-yet-transmitted data within the spool file 18 is smaller than 80 percents of the allowed capacity M2 (YES at step 472), the command transmitting unit 14 calculates K1=(W1−R1)/M, referring to both the shared memory size M1 within the first control memory 20 and also the data amount (W1−R1) 20d within the shared memory 15 (step 473). Then, the command transmitting unit 14 judges as to whether or not K1>0.6. In other words, the command transmitting unit 14 judges as to whether or not the data amount within the shared memory exceeds 60 percents of the shared memory size (step 474). In this fourth embodiment mode, the threshold value "β1" of the K1 value in the command transmitting unit 14 is set to 0.6. However, this set threshold value is one of the typical threshold values. The threshold value β1 may be set to any arbitrary positive value smaller than the threshold value α1 of K1 (0.8 in fourth embodiment mode) used in the print processing unit 12.

When the value of K1 is smaller than, or equal to 0.6, namely when the data amount within the shared memory is smaller than, or equal to 60 percents of the shared memory size M ("NO" at step 473), the command transmitting unit 14 judges as to whether or not the job end command flag 16z is set, referring to the first control memory 20 (step 475). In such a case that the job end command flag 16z is not yet set ("NO" at step 475), the command transmitting unit 14 stops reading of the print command from the shared memory 15 until the data amount within the shared memory 15 becomes larger than 60 percents of the shared memory size M1 (step 475a).

Figure 14:
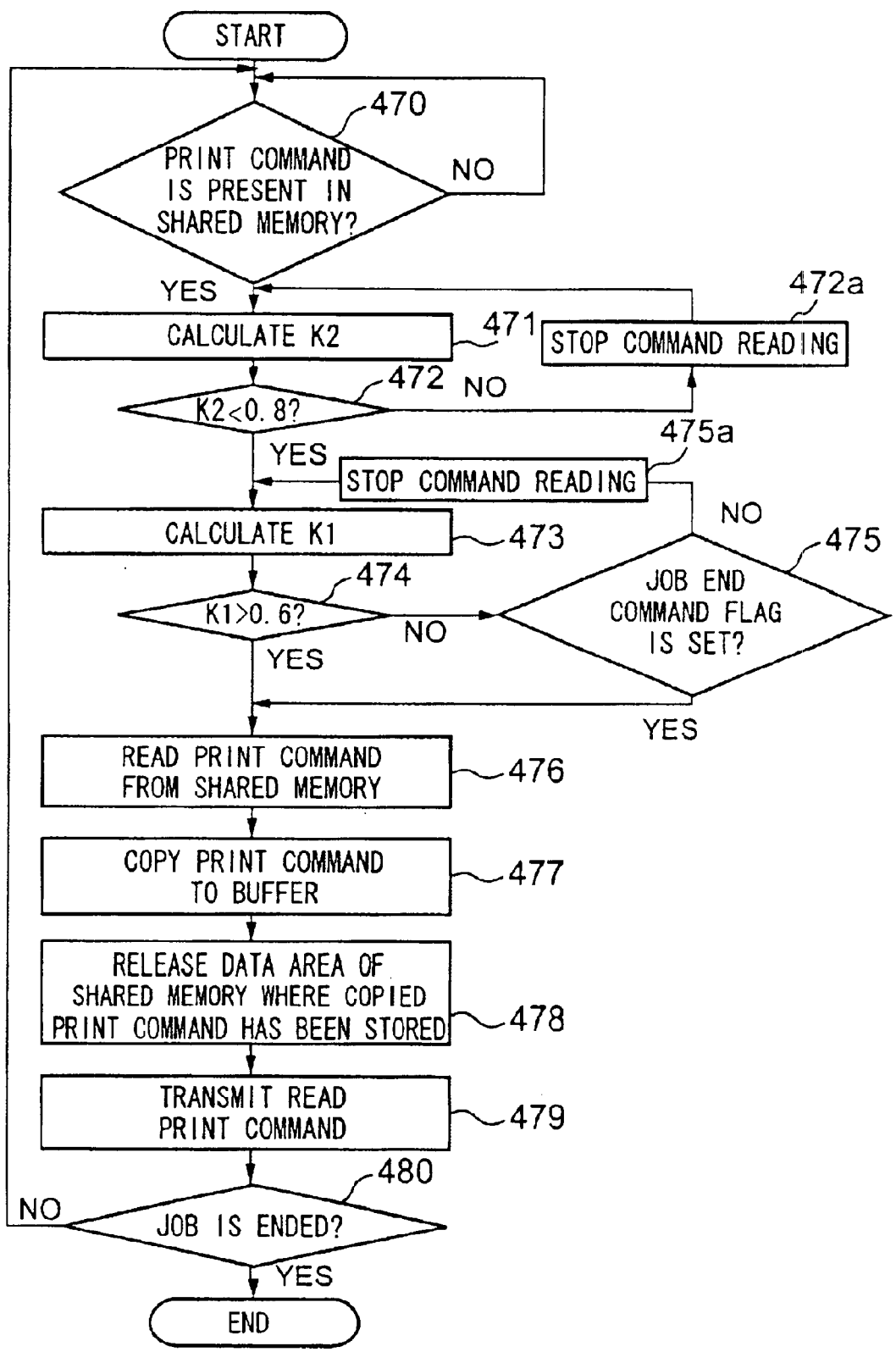
FIG. 14 is a flow chart for describing a process operation of a command transmitting unit employed in the printing control apparatus of the fourth embodiment mode.

As previously described, since the process operations defined at the step 454 (NO) and the step 456 shown in FIG. 13, the step 474 (NO) and the step 475a shown in FIG. 14 are carried out, the command transmitting unit 14 executes the control operation so that the value of K1 becomes larger than 0.6 and becomes smaller than 0.8, namely the data amount within the shared memory 15 becomes larger than 60 percents of the shared memory size and also becomes smaller than 80 percents thereof. As a result, it can be avoided such a fact that the occupation ratio of the CPU 1a is concentrated to the process operation with respect to the shared memory 15, and the CPU resource can be allocated to the respective modules of the printer driver, and the application programs and OS (operating system) other than this printer driver. As a result, the loads can be properly distributed.

On the other hand, when the value of K1 is larger than 0.6, namely when the data amount within the shared memory 15 is larger than 60 percents of the shared memory size M ("YES" at step 472), or in the case that the job end command flag 16z is set ("YES" at step 475), namely in such a case that even if the data amount within the shared memory 15 is smaller than, or equal to 60% of the shared memory size, then the print job is ended, the command transmitting unit 14 reads out the print command from the shared memory 15 (step 476), and copies this read print command into a buffer (not shown) at a step 477. Thereafter, such a memory area where the copied print command has been stored in the shared memory 15 is brought into a rewritable condition (step 478). Subsequently, the command transmitting unit 14 sequentially transmits the print commands to the spooler 17 (step 479). The process operations defined from the step 470 to the step 479 are repeatedly carried out until the print job is ended (step 480).

It should also be noted that as previously explained in the first embodiment mode, the storage capacity of the shared memory 15 may be preferably set based upon the data transfer speed to the printing apparatus in this fourth embodiment mode.

Arrangement of Fifth Printing Control Apparatus

Referring now to drawings, a printing control apparatus 10 according to a fifth embodiment mode of the present invention will be described. This printing control apparatus of the fifth embodiment mode comprises employing an intermediate file. In this printing control apparatus when plural sheets of one same page are printed out, both a shared memory and the intermediate file are used in combination.

Figure 15:
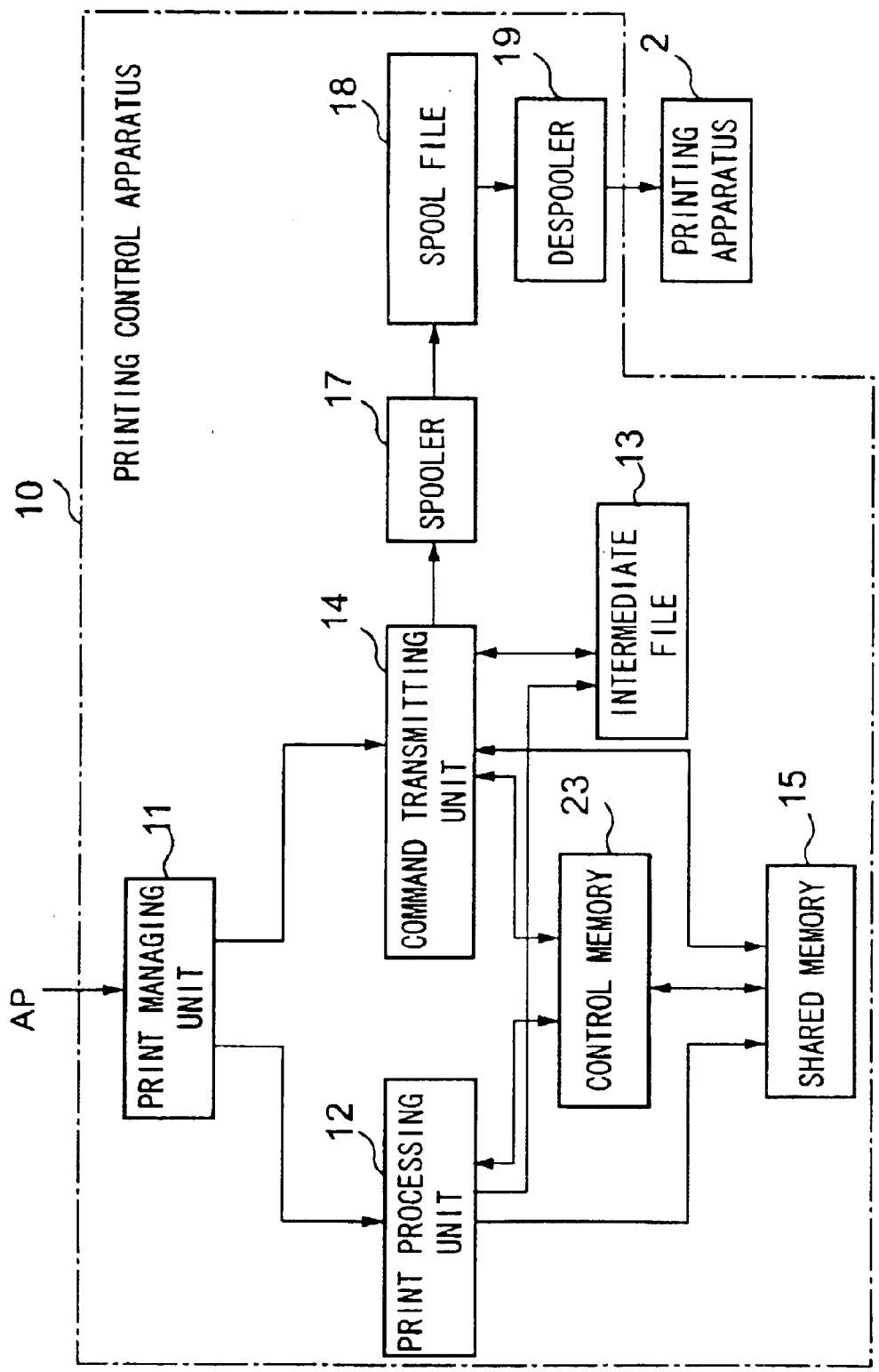
FIG. 15 is a schematic block diagram for showing an arrangement of a major unit of a printing control apparatus according to a fifth embodiment mode of the present invention.

As indicated in FIG. 15, the printing control apparatus 10 of this fifth embodiment mode is realized by adding an intermediate file 13 to the above-explained printing control apparatus shown in FIG. 2. In this fifth embodiment mode, the intermediate file 13 is constituted in, for example, a hard disk 3. Then, this intermediate file 13 owns a larger storage capacity than that of the shared memory 15.

Figure 17:
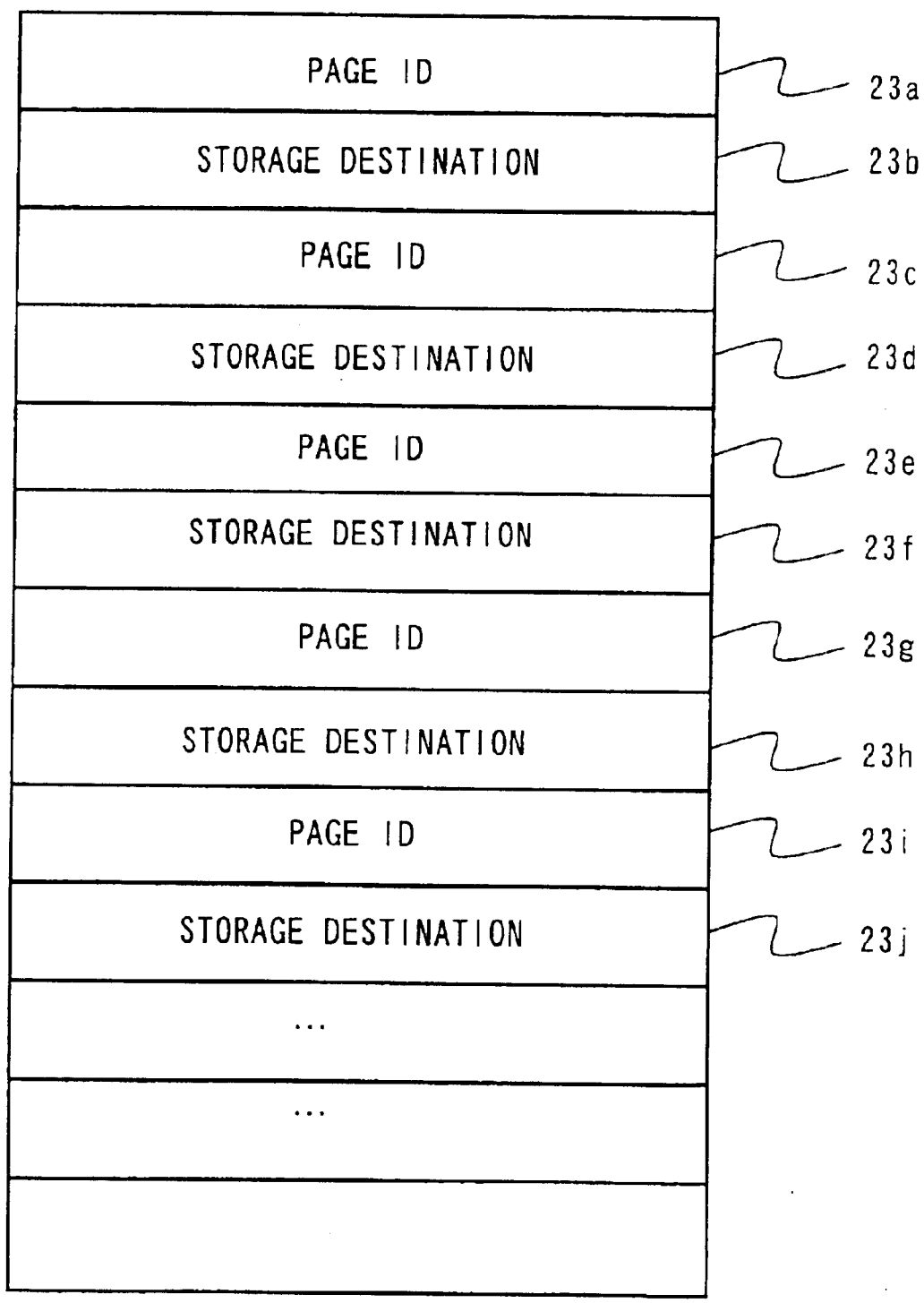
FIG. 17 is an explanatory diagram for explaining an example of control data stored in a control memory employed in, the printing control apparatus of the fifth embodiment mode.

Various sorts of data indicated in FIG. 17 are stored into a control memory 16 in addition to the previously-explained data shown in FIG. 3. The data shown in FIG. 17 has storage destination information indicating that a print command in unit of a page is saved in which device, i.e., either the intermediate file 13 or the shared memory 15. This storage destination information is determined by a print managing unit 11.

For instance, when the printing control apparatus 10 is initiated, the print managing unit 11 secures shared memory 15 having a preset storage capacity or a user-set storage capacity on a RAM 1c. Then, upon receipt of a print command from an application program, the print managing unit 11 issues a print job, and thereafter transmits this print job to a print processing unit 12. In this case, as the various sorts of information related to the above-explained print condition, for instance, the memory size M and the address 16h at which the first block, should be stored, shown in FIG. 3, are transferred to the print processing unit 12.

Printing Operation by Fifth Printing Control Apparatus

Next, printing operation by the printing control apparatus 10 according to this fifth embodiment mode will now be described.

Figure 16:
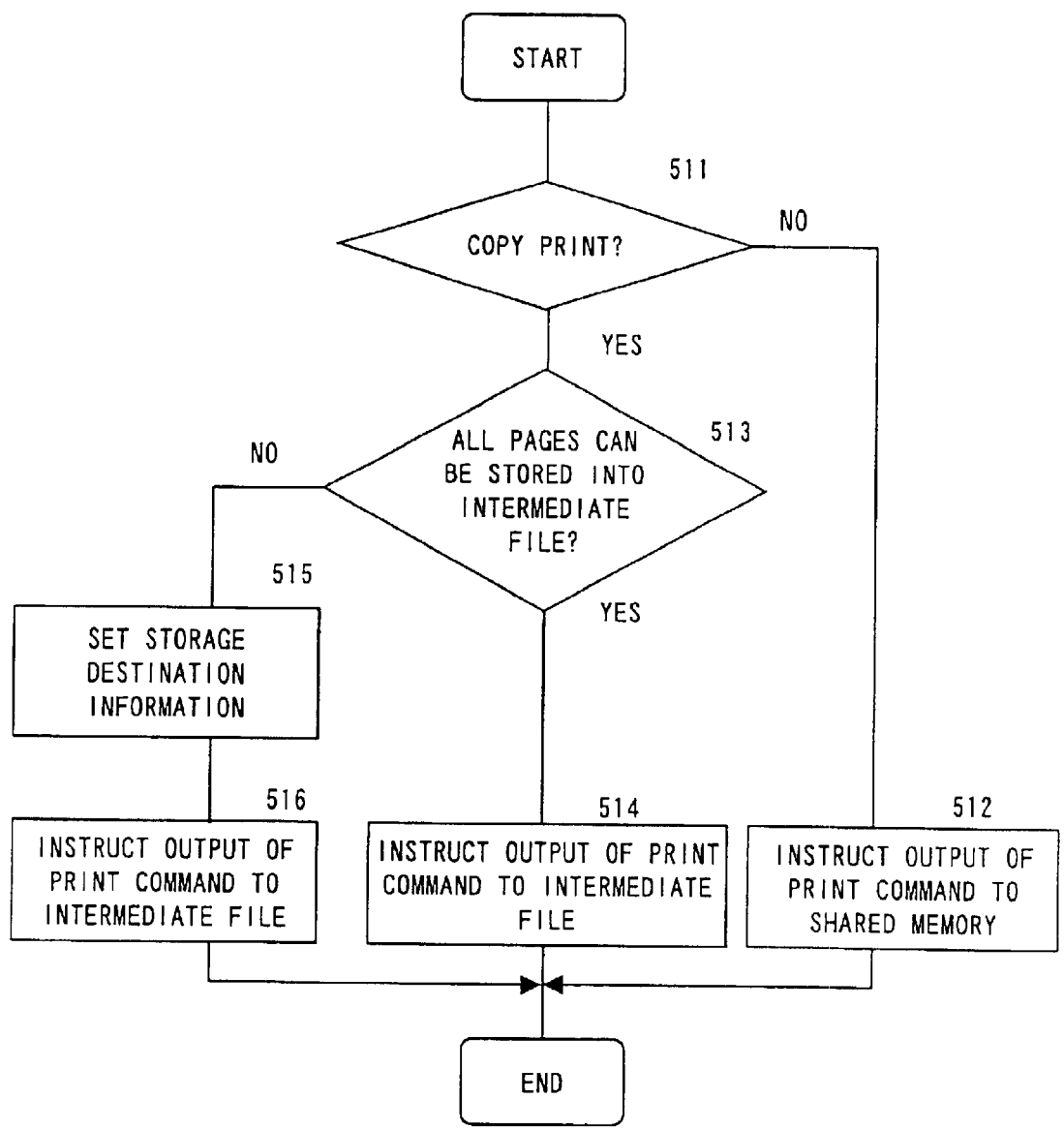
FIG. 16 is a flow chart for describing a process operation of a print managing unit employed in the printing control apparatus of the fifth embodiment mode.

As indicated in a flow chart of FIG. 16, upon receipt of a print instruction made from an application program, the print managing unit 11 checks which type of printing operation this print instruction corresponds to. In other words, the print managing unit 11 judges as to whether only one sheet copy is required, or plural sheets of copies are required (step 511). If this print instruction requests one sheet copy, the print managing unit 11 instructs the print processing unit 12 to output a print command to the shared memory 15 (step 512). At this time, as previously explained with reference to FIG. 4, the print processing unit 12 stores the print condition information such as the memory size M in the memory 16 prior to the printing operation. Thereafter, the print processing unit 12 executes such a process operation that the shared memory 15 temporarily stores the print command in a similar manner to that of the previously explained other embodiment modes. Therefore, detailed descriptions thereof are omitted here.

On the other hand, when plural sheets of copies are requested, the print managing unit 11 checks as to whether or not all pages can be stored into the intermediate file 13 (step 513). Concretely speaking, the print managing unit 11 executes this judgment in accordance with the following manner. That is, this print managing unit 11 interrogates the operating system (OS) so as to acquire a dimension of a storage area on the hard disk drive, which is allocated in order to store this print command, and also investigate a data amount of the print data sent from the application program. If all pages can be stored into the intermediate file 13, the print managing unit 11 instructs the print processing unit 12 to output a print command to the intermediate file 13 (step 514).

Figure 18:
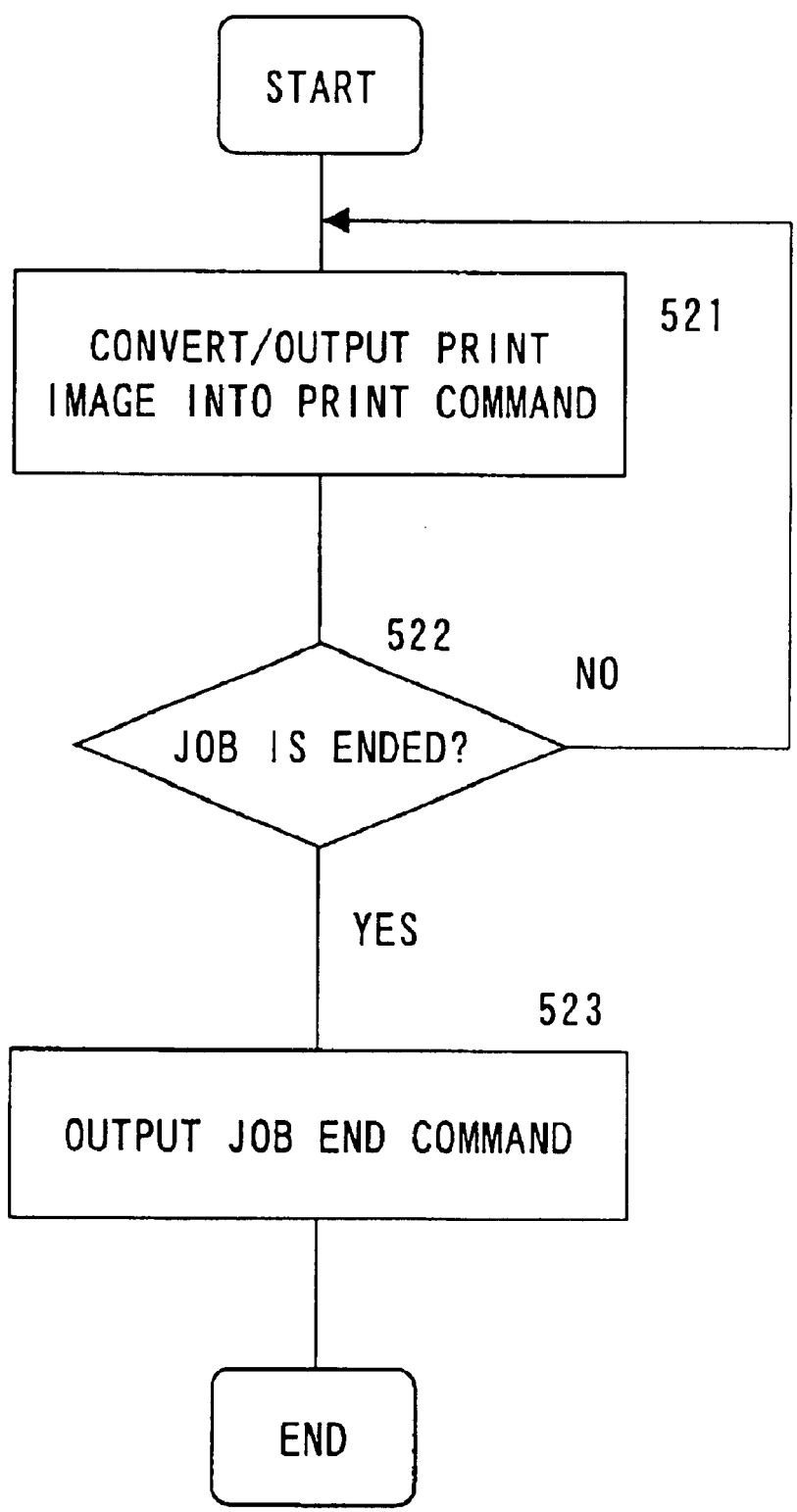
FIG. 18 is a flow chart for describing a process operation of a print processing unit employed in the printing control apparatus of the fifth embodiment mode.

As indicated in FIG. 18, after the print processing unit 12 converts a print image into a print command, the print processing unit 12 stores the produced print command into the intermediate file 13 (step 521). In this case, plural sheets of the same one page are printed out, and therefore, plural sets of printed matters are required to be produced. However, since all of the print commands are saved in the intermediate file 13 until the print job is ended, only one set of such print commands are stored in this intermediate file 13.

Also, the print processing unit 12 monitors as to whether or not the print job is accomplished (step 522). The producing operation and the storage operation of the print image are repeatedly carried out until the print job is ended. On the other hand, when the print job is ended, the print processing unit 12 notifies to the print managing unit 11 that the print commands have been converted and have been stored into the intermediate file 13 by outputting an end command (step 523).

Next, if it is judged that only portions of these print commands may be saved in the intermediate file 13 ("NO" at step 513), the print managing unit 11 designates a storage destination in unit of a page as to the print job (step 515). This designation of the storage destination may be carried out by, for example, forming such a table as shown in FIG. 17. The formed table is stored into a control memory 16. As shown in FIG. 17, page IDs combined with storage destinations are stored in this control memory 16. For example, the following destinations may be made: a first page-intermediate file; a second page-intermediate file; and a third page-shared memory. This information is utilized where that the command transmitting unit reads the command.

The print processing unit 12 executes a converting process operation to a print command as to the print job sent from the print managing unit 11, and then, determines as to whether this converted print command is to be outputted to the intermediate file 13 or the shaped memory 15, referring to the storage destination information (shown in FIG. 17) stored in the control memory 16. When this storage destination information indicates the intermediate file 13, the print processing unit 12 transmits this print command to the intermediate file 13. On the other hand, when the storage destination information indicates the shared memory 15, the print processing unit 12 stores the print command into the shared memory 15 in accordance with the previously explained sequence shown in FIG. 4. In this case, the print processing unit 12 refers to the data indicated in FIG. 3.

Figure 19:
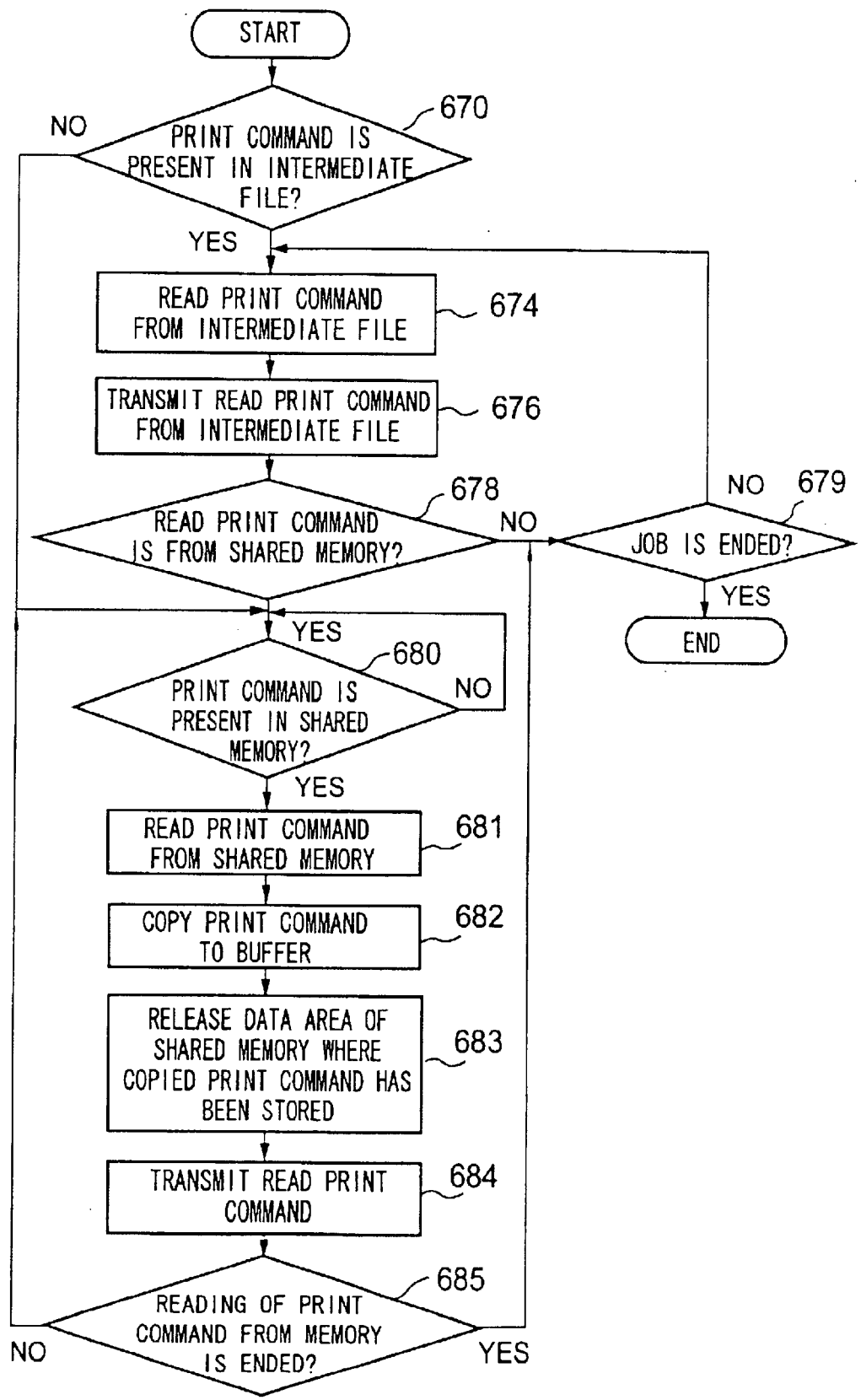
FIG. 19 is a flow chart for describing a process operation of a command transmitting unit employed in the printing control apparatus of the fifth embodiment mode.

Command Processing Operation by Command Transmitting Unit in Fifth Printing Control Apparatus Referring now to a flow chart of FIG. 19, a process sequence of the command transmitting unit 14 will be described.

The command transmitting unit 14 accepts a command transmission instruction containing an instruction for instructing which pages are to be read in what order from the print managing unit 11. First, the command transmitting unit 14 judges as to whether or not a relevant file is present in the intermediate file 13 (step 670). In the case that the print command to be transmitted is present in the intermediate file 13, the command transmitting unit 14 reads the print command from the intermediate file 13 (step 674), copies this read print command into a buffer (not shown) and then transmits the print command at a step 676. At this time, the command transmitting unit 14 checks as to whether or not the print command is to be read out from the shared memory 15 (step 678). This checking result may be obtained by investigating the control memory 16. In other words, when (W−R)>0 in the shared memory 15, it can be seen that the print command to be read is present in the shared memory 15. Similarly, as indicated in FIG. 16, the above-described judgment can be made by checking as to whether the print managing unit 11 instructs that the print command be outputted to the intermediate file 13, or both to the intermediate file 13 and the shared memory 15. Furthermore, this judgment may be made by referring to the storage destination information shown in FIG. 17.

The process operations defined from the step 674 to the step 679 are repeatedly carried out until all of the print commands stored in the intermediate file 13 are read out. When all of these print commands have been read out, the print job is accomplished (step 679).

Figure 5:
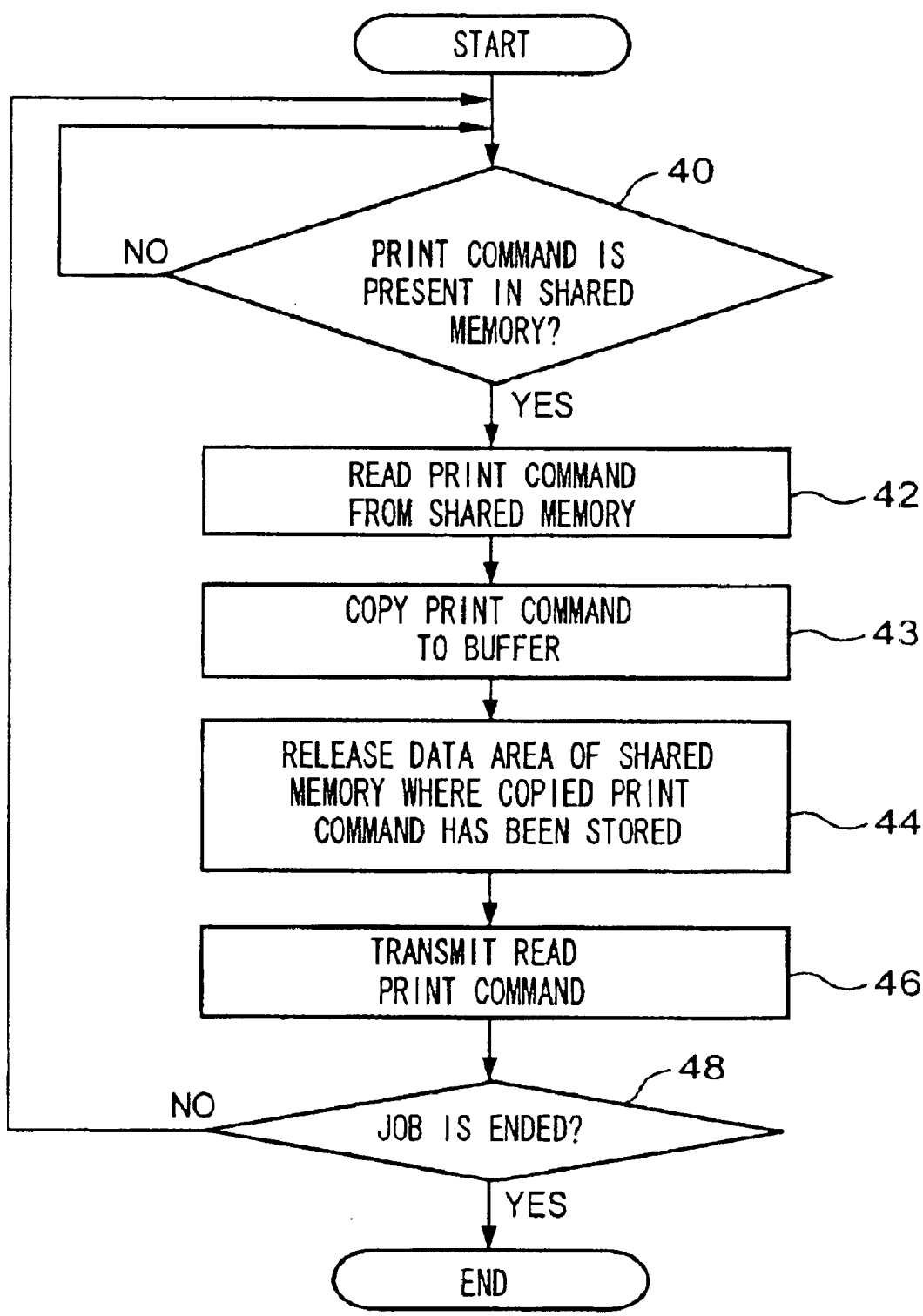
FIG. 5 is a flow chart for describing a process operation of a command transmitting unit employed in the printing control apparatus of the first embodiment mode.

On the other hand, process operations defined from a step 680 to a step 685 are executed in accordance with the same sequential operation to that shown in FIG. 5. Descriptions thereof are omitted here. It should also be noted that since the print command may be written into the shared memory 15 when the shared memory 15 is designated, the print job is accomplished after the print command has been written and the reading operation of the print command to be read is completed (step 635).

Also, in this fifth embodiment mode, the storage capacity of the shared memory 15 may be set based upon the data transfer speed to the printing apparatus.

Further, in this firth embodiment mode, the command transmitting unit 14 judges as to whether the print command is stored in the intermediate file or the shared memory, in the unit of the page. However, the present invention is not limited thereto. For example, the command transmitting unit 14 may judge as to whether the print command is stored in the intermediate file or the shared memory, in a smaller unit than the page unit, e.g., in unit of a block.

Moreover, also in this fifth embodiment mode, the memory managing unit as indicated in FIG. 9 may be employed so that this memory managing unit may control the read/write operations from/into the shared memory by both the print processing unit 12 and the command transmitting unit 14.

In accordance with this fifth embodiment mode, a print commands are stored, as many as possible, into the storageable area of the intermediate file in the hard disc. Therefore, when the copy printing operation is carried out, as to the print command formed in the intermediate file, the print commands are read out from the intermediate file plural times equal to a total number of command copies to execute the printing operation instead of the following command conversions. That is, the print data is converted into the print command having such a specific format to the printing apparatus plural times equal to a total number of command copies. In general, a reading speed of a print command from an intermediate file is faster than a converting speed from print data to a print command. Therefore, when a copy printing operation is carried out, a printing speed can be increased by forming such an intermediate file.

In addition, in accordance with this fifth embodiment mode, this printing control operation thereof may be similarly applied to such a print command that a print job is large and an intermediate file cannot be formed. In other words, similar to the first embodiment mode, since the printing operation can be executed by employing the intermediate memory, ever when a large-sized print is made, the printing operation is not interrupted in a half way.

According to the present invention, even when an amount of print commands is large, the print commands can be stored in a storage area having a small capacity. Furthermore, according to the present invention, printing control which hardly causes interruption of the printing in a half way, is realized.

What is claimed is:

1. A computer readable recording medium recording thereon a program, which causes a computer to execute:
   a process operation for successively storing a plurality of print commands into a memory allocated with a certain size, wherein said plurality of print commands are converted from print data relating to a single print job;
   a process operation for successively reading each of said print commands from said memory to transmit said print command to a printing apparatus; and
   a process operation for rendering an area of said memory, where one of said print commands has been stored, rewritable after the one of said print commands is read from the memory, so that another print command converted from said print data can be stored in said area.

2. A recording medium as claimed in claim 1 wherein:
said recording medium records thereon a program for causing said computer to execute a process operation by which data for controlling read/write operation of a print command to said memory is produced, and said control data is stored into another storage area of said memory.

3. A recording medium as claimed in claim 2 wherein:
said recording medium records thereon a program containing a size of said memory and a data amount presently stored in said memory as said control data.

4. A recording medium as claimed in claim 2 wherein:
said recording medium records thereon a program containing information indicative of a position within said memory where said print command is stored as said control data.

5. A recording medium as claimed in claim 1 wherein:
said recording medium records thereon a program for causing the computer to further execute;
a process operation for acquiring an index indicative of a stored amount of said print command within said memory; and
a process operation for stopping a process operation for storing said print command into the memory when said index is larger than, or equal to a first preset threshold value.

6. A recording medium as claimed in claim 5 wherein:
said recording medium records thereon a program for causing the computer further to execute:
a process operation for stopping a process operation for reading said stored print command when said index is smaller than, or equal to a second preset threshold value.

7. A computer readable recording medium recording thereon a program, which causes a computer to execute:
   a process operation for successively storing a plurality of print commands converted from print data into a memory allocated with a certain size;
   a process operation for successively reading each of said print commands from said memory to transmit said print command to a printing apparatus; and
   a process operation for rendering an area of said memory, where one of said print commands has been stored, rewritable after the one of said print commands is read from the memory, so that another print command converted from said print data can be stored in said area,
   wherein:
   said recording medium records thereon a program for causing the computer to further execute:
   a process operation for acquiring an index indicative of a stored amount of said print command within said memory; and
   a process operation for stopping a process operation for reading said stored print command when said index is smaller than, or equal to a second preset threshold value.

8. A computer readable recording medium recording thereon a program, which causes a computer to execute:
   a process operation for successively storing a plurality of print commands converted from print data into a memory allocated with a certain size;
   a process operation for successively reading each of said print commands from said memory to transmit said print command to a printing apparatus; and
   a process operation for rendering an area of said memory, where one of said print commands has been stored, rewritable after the one of said print commands is read from the memory, so that another print command converted from said print data can be stored in said area,
   wherein:
   said recording medium records thereon a program for causing the computer further to execute:
   a process operation for storing said converted print command into a file having such a nature that a print command is saved until a print job is ended, when a print job contains an instruction for printing plural sheets of the same page.

9. A recording medium as claimed in claim 8 wherein:

said recording medium records thereon a program for causing the computer further to execute:

a process operation for storing, when said print command cannot be saved in said file, the not-yet-saved print command into said memory.

10. A printing control method for controlling writing and transmitting of a print command, which comprises:

a process operation for successively storing a plurality of print commands into a memory allocated with a certain size, wherein said plurality of print commands are converted from print data relating to a single print job;

a process operation for successively reading each of said print commands from said memory to transmit said print command to a printing apparatus; and a process operation executed for rendering an area of said memory, where one of said print commands has been stored, rewritable after the one of said print commands is read from the memory, so that another print command converted from said print data can be stored in said area.

11. A printing control method for controlling writing and transmitting of a print command, which comprises:

a process operation for successively storing a plurality of print commands converted from print data into a memory allocated with a certain size;

a process operation for successively reading each of said print commands from said memory to transmit said print command to a printing apparatus;

a process operation executed for rendering an area of said memory, where one of said print commands has been stored, rewritable after the one of said print commands is read from the memory, so that another print command converted from said print data can be stored in said area;

a process operation for acquiring an index indicative of a stored amount of said print command within said memory; and a process operation for stopping, when said index is larger than, or equal to a first preset threshold value, such a process operation for storing said print command into the memory.

12. A printing control method as claimed in claim 11 which further comprises:

a process operation for stopping, when said index is smaller than, or equal to a second preset threshold value, such a process operation for reading said stored print command.

13. A printing control method for controlling writing and transmitting of a print command, which comprises:

a process operation for successively storing a plurality of print commands converted from print data into a memory allocated with a certain size;

a process operation for successively reading each of said print commands from said memory to transmit said print command to a printing apparatus;

a process operation executed for rendering an area of said memory, where one of said print commands has been stored, rewritable after the one of said print commands is read from the memory, so that another print command converted from said print data can be stored in said area;

a process operation for storing, when a print job contains an instruction for printing plural sheets of the same page, said converted print command into a file having such a nature that a print command is saved until a print job is ended.

14. A printing control method as claimed in claim 13 which further comprises:

a process operation for storing, when said print command cannot be saved in said file, said not-yet-saved print command into said memory.

15. A printing control apparatus for controlling writing/transmitting operations of a print command, comprising:

means which successively stores a plurality of print commands converted from print data into a memory allocated with a certain size, wherein said plurality of print commands are converted from print data relating to a single print job;

means which successively reads each of said print commands from said memory to transmit said print command to a printing apparatus; and means which renders an area of said memory, where said print command has been stored, rewritable so that another print command converted from said print data can be stored in said area.

16. A printing control apparatus for controlling writing/transmitting operations of a print command, comprising:

means which successively stores a plurality of print commands converted from print data into a memory allocated with a certain size;

means which successively reads each of said print commands from said memory to transmit said print command to a printing apparatus;

means which renders an area of said memory, where said print command has been stored, rewritable so that another print command converted from said print data can be stored in said area, means which acquires an index indicative of a stored amount of said print command within said memory; and means which stops, when said index is larger than, or equal to a first preset threshold value, such a process operation for storing said print command into the memory.

17. A printing control apparatus as claimed in claim 16, further comprising:

means which stops, when said index is smaller than, or equal to a second preset threshold value, such a process operation for reading said stored print command.

18. A printing control apparatus for controlling writing/transmitting operations of a print command, comprising:

means which successively stores a plurality of print commands converted from print data into a memory allocated with a certain size;

means which successively reads each of said print commands from said memory to transmit said print command to a printing apparatus;

means which renders an area of said memory, where said print command has been stored, rewritable so that another print command converted from said print data can be stored in said area; and means which stores, when a print job contains an instruction for printing plural sheets of the same page, said converted print command into a file having such a nature that a print command is saved until a print job is ended.

19. A printing control apparatus as claimed in claim 18, further comprising:
means which stores, when said print command cannot be saved in said file, the not-yet-saved print command into said memory.

20. A computer readable recording medium for recording thereon a program for causing a computer to execute:
a converting/storing process operation for converting print data into a print command having a predetermined format and for storing the converted print command into a first memory;
a first stopping process operation for stopping said converting/storing process operation in the case that a ratio of a print command amount stored into said first memory to a storage capacity of said first memory is larger than, or equal to a first threshold value;
a reading/storing process operation for reading said stored print command and for storing said read print command into a second memory;
a transmitting process operation for transmitting the print command stored into said second memory to a printing apparatus;
a releasing process operation for executing a process operation such that a storage area of said first memory from which said print command is read is rewritable;
a second stopping process operation for stopping said reading/storing process operation in the case that a ratio of a print command amount stored into said first memory to the storage capacity of said first memory is smaller than, or equal to a second threshold value; and
a third stopping process operation for stopping said reading/storing process operation in such a case that a ratio of a print command amount stored into said second memory to a storage capacity of said second memory is larger than, or equal to a third threshold value.

21. A printing control method comprising:
a converting/storing step for converting print data into a print command having a predetermined format and for storing said converted print command into a first memory;
a first stopping step for stopping said converting/storing step in the case that a ratio of a print command amount stored into said first memory to a storage capacity of said first memory is larger than, or equal to a first threshold value;
a reading/storing step for reading said stored print command and for storing said read print command into a second memory;
a transmitting step for transmitting the print command stored into said second memory to a printing apparatus;
a releasing step for executing a process operation such that a storage area of said first memory from which said print command is read is rewritable;
a second stopping step for stopping said reading/storing step in the case that a ratio of a print command amount stored into said first memory to the storage capacity of said first memory is smaller than, or equal to a second threshold value; and
a third stopping step for stopping said reading/storing step in such a case that a ratio of a print command amount stored into said second memory to a storage capacity of said second memory is larger than, or equal to a third threshold value.

22. A printing control apparatus comprising:
converting/storing means which converts print data into a print command having a predetermined format and for storing said converted print command into a first memory;
first stopping means which stops said converting/storing means in the case that a ratio of a print command amount stored into said first memory to a storage capacity of said first memory is larger than, or equal to a first threshold value;
reading/storing means which reads said stored print command and for storing said read print command into a second memory;
transmitting means which transmits the print command stored into said second memory to a printing apparatus;
releasing means which executes a process operation such that a storage area of said first memory from which said print command is read is rewritable;
second stopping means which stops said reading/storing means in the case that a ratio of a print command amount stored into said first memory to the storage capacity of said first memory is smaller than, or equal to a second threshold value; and
third stopping means which stops said reading/storing means in such a case that a ratio of a print command amount stored into said second memory to a storage capacity of said second memory is larger than, or equal to a third threshold value.

23. A printing control apparatus, comprising:
a memory; and
a control circuit,
wherein said control circuit successively stores a plurality of print commands converted from print data into said memory, wherein said plurality of print commands are converted from print data relating to a single print job; and
wherein said control circuit successively reads each of said print commands from said memory and transmits said print command to a printing apparatus, and
wherein said control circuit renders an area of said memory, where said print command has been stored, rewritable so that another print command converted from said print data can be stored in said area.

24. A printing control apparatus, comprising:
a memory; and
a control circuit,
wherein said control circuit successively stores a plurality of print commands converted from print data into said memory; and
wherein said control circuit successively reads each of said print commands from said memory and transmits said print command to a printing apparatus,
wherein said control circuit renders an area of said memory, where said print command has been stored, rewritable so that another print command converted from said print data can be stored in said area, and
wherein said control circuit acquires an index indicative of a stored amount of said print command within said memory; and
said control circuit stops storing said print command into the memory when said index is larger than, or equal to a first preset threshold value.

25. A printing control apparatus as claimed in claim 24, wherein:

said control circuit stops reading said stored print command when said index is smaller than, or equal to a second preset threshold value.

26. A printing control apparatus, comprising:

a memory; and a control circuit, wherein said control circuit successively stores a plurality of print commands converted from print data into said memory; and wherein said control circuit successively reads each of said print commands from said memory and transmits said print command to a printing apparatus, wherein said control circuit renders an area of said memory, where said print command has been stored, rewritable so that another print command converted from said print data can be stored in said area, and wherein said control circuit stores said converted print command into a file that saves a print command until a print job is ended, when a print job contains an instruction for printing plural sheets of the same page.

27. A printing control apparatus as claimed in claim 26, wherein:

said control circuit stores a not-yet-saved print command into said memory, when said print command cannot be saved in said file.

28. A printing control apparatus comprising:

a first memory;

a second memory; and a control circuit, wherein said control circuit converts print data into print commands having a predetermined format and stores said converted print commands into said first memory;

wherein said control circuit stops storing converted print commands when a ratio of a print command amount stored into said first memory to a storage capacity of said first memory is larger than, or equal to a first threshold value;

wherein said control circuit reads said stored print commands and stores said read print commands in said second memory;

wherein said control circuit transmits said read print commands stored in said second memory to a printing apparatus;

wherein said control circuit releases a storage area of said first memory which stores the converted print commands, after the converted print commands have been read, such that the storage area becomes rewritable;

wherein said control circuit stops storing said read print commands into said second memory when a ratio of a print command amount stored into said first memory to the storage capacity of said first memory is smaller than, or equal to a second threshold value; and wherein said control circuit stops storing said read print commands into said second memory when a ratio of a print command amount stored into said second memory to a storage capacity of said second memory is larger than, or equal to a third threshold value.

* * * * *